US010660808B2

(12) United States Patent
Hashimoto

(10) Patent No.: US 10,660,808 B2
(45) Date of Patent: May 26, 2020

(54) NURSING BED

(71) Applicant: KAWASAKI JUKOGYO KABUSHIKI KAISHA, Kobe-shi, Hyogo (JP)

(72) Inventor: Yasuhiko Hashimoto, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/322,366

(22) PCT Filed: Jun. 24, 2015

(86) PCT No.: PCT/JP2015/068219
§ 371 (c)(1),
(2) Date: Dec. 27, 2016

(87) PCT Pub. No.: WO2015/199137
PCT Pub. Date: Dec. 30, 2015

(65) Prior Publication Data
US 2017/0258656 A1    Sep. 14, 2017

(30) Foreign Application Priority Data

Jun. 25, 2014  (JP) ................................. 2014-130340

(51) Int. Cl.
*A61G 7/018*  (2006.01)
*A61G 7/057*  (2006.01)
(Continued)

(52) U.S. Cl.
CPC ............. *A61G 7/018* (2013.01); *A61G 7/005* (2013.01); *A61G 7/015* (2013.01); *A61G 7/057* (2013.01);
(Continued)

(58) Field of Classification Search
CPC ........ A61G 7/018; A61G 7/005; A61G 7/015; A61G 7/057; A61G 7/05707;
(Continued)

(56) References Cited

U.S. PATENT DOCUMENTS 4,999,861 A * 3/1991 Huang ................. A47C 21/006
5/600
5,092,315 A * 3/1992 Bennett .................... A61H 1/00
601/101

(Continued)

FOREIGN PATENT DOCUMENTS

JP    H01-238859 A    9/1989
JP    H02-3721 U    1/1990
(Continued)

OTHER PUBLICATIONS

Sep. 29, 2015 Search Report issued in International Patent Application No. PCT/JP2015/068219.
(Continued)

*Primary Examiner* — Robert G Santos
*Assistant Examiner* — Rahib T Zaman
(74) *Attorney, Agent, or Firm* — Oliff PLC

(57) ABSTRACT

This nursing bed has a fixed member forming a fixed bed surface of a bed portion on which a care receiver lies, a movable member which can be moved relative to the fixed member and forms a movable bed surface of the bed portion, and a movable member driving unit for driving the movable member. The fixed member has a plurality of slender parts each extending in the lateral direction or the longitudinal direction. The movable member has a mobile body which can be protruded upward relative to the fixed bed surface and also moved in at least one of the longitudinal direction and the lateral direction via an interval between the plurality of slender parts by the movable member driving unit. The (Continued)

posture of the care receiver lying on the bed can be changed into his/her optimal position without difficulty.

24 Claims, 31 Drawing Sheets

(51) Int. Cl.
  *A61G 7/005*  (2006.01)
  *A61G 7/015*  (2006.01)
  *A61G 7/10*  (2006.01)
  *B25J 9/00*  (2006.01)
  *B25J 11/00*  (2006.01)
  *A61G 7/008*  (2006.01)

(52) U.S. Cl.
  CPC ....... *A61G 7/05707* (2013.01); *A61G 7/1025* (2013.01); *B25J 9/0009* (2013.01); *B25J 11/009* (2013.01); *A61G 7/008* (2013.01); *A61G 2203/42* (2013.01)

(58) Field of Classification Search
  CPC . A61G 7/1025; A61G 2203/42; B25J 9/0009; B25J 11/009
  See application file for complete search history.

(56) References Cited

U.S. PATENT DOCUMENTS

| | | | | |
|---|---|---|---|---|
| 5,233,712 A * | 8/1993 | Jurus | .................... | A61G 7/0573 5/611 |
| 5,699,566 A * | 12/1997 | Chuang | .................. | A61G 7/001 5/613 |
| 6,360,386 B1 * | 3/2002 | Chuang | .................. | A61G 7/001 5/607 |
| 6,799,342 B1 * | 10/2004 | Jarmon | ................. | A61G 7/0573 5/191 |
| 10,092,468 B2 * | 10/2018 | Hashimoto | ............ | A47C 20/04 |
| 2004/0064896 A1 * | 4/2004 | Partian | .................... | A61G 7/057 5/713 |
| 2006/0085913 A1 * | 4/2006 | Kawakami | ........... | A47C 19/045 5/618 |
| 2009/0077748 A1 * | 3/2009 | Kim | ........................ | A47C 19/04 5/613 |
| 2010/0222724 A1 * | 9/2010 | Huang | ................. | A61G 7/0573 601/115 |
| 2015/0164721 A1 * | 6/2015 | Miyashita | ............ | A61G 7/0573 5/617 |

FOREIGN PATENT DOCUMENTS

| | | |
|---|---|---|
| JP | H06-154271 A | 6/1994 |
| JP | H07-8523 A | 1/1995 |
| JP | H07-303674 A | 11/1995 |
| JP | 3026674 U | 7/1996 |
| JP | 2716093 B2 | 2/1998 |
| JP | H11-239524 A | 9/1999 |
| JP | 2000-325408 A | 11/2000 |
| JP | 2000-342633 A | 12/2000 |
| JP | 2002-078755 A | 3/2002 |
| JP | 2002-085481 A | 3/2002 |
| JP | 2004-222908 A | 8/2004 |
| JP | 4231363 B2 | 2/2009 |
| JP | 2014-061053 A | 4/2014 |
| JP | 6345119 B2 | 6/2018 |
| WO | 2004/026211 A1 | 4/2004 |
| WO | 2014/030620 A1 | 2/2014 |

OTHER PUBLICATIONS

Dec. 27, 2016 International Preliminary Report on Patentability issued in International Patent Application No. PCT/JP2015/068219.

* cited by examiner

偏心

|  | current angle | → | → | → | → → | target angle |
|---|---|---|---|---|---|---|
| head | 30° | 20° | 20° | 20° | ‥ | 0° |
| shoulder | 20° | 10° | 10° | 0° | ‥ | 0° |
| back | 10° | 10° | 10° | 0° | ‥ | 0° |
| waist | -10° | -10° | -10° | -10° | ‥ | 0° |
| upper leg | -20° | -20° | -10° | -10° | ‥ | 0° |
| lower leg | -30° | -30° | -20° | -20° | ‥ | 0° |

FIG. 42

NURSING BED

TECHNICAL FIELD

The present invention relates to a nursing bed and particularly relates to a nursing bed capable of moving the body of a care receiver lying on the bed.

BACKGROUND ART

Care receivers get bedsores easily if they need to be in bed for a long period of time, which is severely painful for them. Bedsores occur especially in protruding parts with bones such as the waist, shoulders, and ankles because of poor blood circulation due to pressure of the body weight, resulting in necrosis.

Posture of a care receiver needs to be changed appropriately in order to prevent bedsores, and in particular when the care receiver has difficulty moving his/her body by himself/herself, a caregiver needs to take appropriate measures such as putting a pillow under the waist of the care receiver.

The caregiver needs to move a heavy body of the care receiver in order to prevent bedsores, which is a hard work. Moreover, the work needs to be done night and day, for example every one or two hours, which is a heavy burden for the caregiver. Additionally, the care receiver also tends to feel a mental burden about forcing a hard work on the caregiver.

In order to reduce such burden on the caregiver (and the care receiver), a technology is proposed, where a part of a bed surface (lying surface) of a nursing bed is made movable and the movable portion of the bed surface is appropriately moved manually or by using power so as to change the posture of the case receiver (refer to Patent Literatures 1 to 11 below).

RELATED ART LITERATURES

Patent Literatures

[Patent Literature 1] Japanese Patent No. 2716093
[Patent Literature 2] Japanese Patent Application Laid-open No. 2000-342633
[Patent Literature 3] Japanese Patent Application Laid-open No. 2002-78755
[Patent Literature 4] Japanese Patent Application Laid-open No. 4231363
[Patent Literature 5] Japanese Patent Application Laid-open No. H01-238859
[Patent Literature 6] Japanese Patent Application Laid-open No. H07-8523
[Patent Literature 7] Japanese Patent Application Laid-open No. H07-303674
[Patent Literature 8] Japanese Patent Application Laid-open No. H11-239524
[Patent Literature 9] Japanese Patent Application Laid-open No. 2000-325408
[Patent Literature 10] Japanese Patent Application Laid-open No. 2002-85481
[Patent Literature 11] Japanese Patent Application Laid-open No. 2004-222908

SUMMARY OF INVENTION

Problems to be Solved by the Invention

However, in a conventionally proposed nursing bed, the whole body of a care receiver is merely slid simultaneously on a bed portion of a bed, or a part (for example, a part corresponding to the upper body) of the bed surface of the bed is merely inclined so as to support the posture of the care receiver on the inclined bed surface of the bed, or alternatively, an unnatural strong force is applied locally when moving the body of the care receiver, imposing a burden on the body of the care receiver.

Therefore, in a conventionally proposed nursing bed, it is excessively difficult, or impossible to change the posture of a care receiver into his/her optimal position for preventing bedsores or the like without difficulty.

Additionally, in a conventional nursing bed, since a mechanism for changing the posture of a care receiver is mechanically incorporated integrally with a bed body, a posture changing mechanism cannot be appropriately added to especially a portion where bedsores need to be prevented according to types of care receivers (severely ill in legs, severely ill in the waist, or the like).

The present invention is made considering the above-mentioned problems of the conventional technology and its object is to provide a nursing bed capable of changing the posture of a care receiver lying on the bed into his/her optimal position without difficulty.

Means for Solving the Problems

The present invention according to a first aspect is a nursing bed with a dimension in a longitudinal direction and a dimension in a lateral direction, comprising: a fixed member forming a fixed bed surface of a bed portion on which a care receiver lies; a movable member which can be moved relative to the fixed member and forms a movable bed surface of the bed portion; and a movable member driving unit for driving the movable member, wherein the fixed member has a plurality of slender parts each extending in the lateral direction or the longitudinal direction, and wherein the movable member has a mobile body which can be protruded upward relative to the fixed bed surface and also moved in at least one of the longitudinal direction and the lateral direction via an interval between the plurality of slender parts by the movable member driving unit.

The present invention according to a second aspect is that, in the present invention according to the first aspect, the fixed member further has a plurality of additional slender parts each extending in the longitudinal direction or the lateral direction; wherein the fixed member is formed in a lattice shape by the plurality of slender parts and the plurality of additional slender parts.

The present invention according to a third aspect is that, in the present invention according to the first or second aspect, the movable member has the plurality of mobile bodies, wherein the movable member driving unit can make the plurality of mobile bodies move simultaneously.

The present invention according to a fourth aspect is that, in the present invention according to any one of the first to third aspects, the movable member has the plurality of mobile bodies, wherein the movable member driving unit can make the plurality of mobile bodies move independently from each other.

The present invention according to a fifth aspect is that, in the present invention according to any one of the first to fourth aspects, the movable member driving unit is configured such that a rotational driving force is transmitted from a rotational driver mounted to a distal end portion of a robot arm.

The present invention according to a sixth aspect is that, in the present invention according to the fifth aspect, the movable member driving unit has a plurality of rotated drivers selectively and separably connected to the rotational driver, and the plurality of rotated drivers are installed corresponding to motions of the movable members different from each other, respectively.

The present invention according to a seventh aspect is that, in the present invention according to any one of the first to sixth aspects, the movable member is arranged such that the movable bed surface is normally positioned at the same level as the fixed bed surface or at a level lower than the fixed bed surface.

The present invention according to an eighth aspect is a nursing bed with a dimension in a longitudinal direction and a dimension in a lateral direction, comprising: a bed portion on which a care receiver lies, having a plurality of bed portion units which can be moved so as to be inclined independently from each other; and a bed portion unit driving unit for driving the plurality of bed portion units so as to be inclined independently from each other, wherein each of the plurality of bed portion units has a fixed member forming a fixed bed surface of the bed portion unit; a movable member which can be moved relative to the fixed member and forms a movable bed surface of the bed portion unit; and a movable member driving unit for driving the movable member, and wherein the movable member has a mobile body which can be protruded upward relative to the fixed bed surface and also moved in at least one of the longitudinal direction and the lateral direction via an opening formed in the fixed member by the movable member driving unit.

The present invention according to a ninth aspect is that, in the present invention according to the eighth aspect, in at least one bed portion unit of the plurality of bed portion units, the movable member driving unit can make the mobile body rotationally move about an axis in the longitudinal direction or an axis in the lateral direction.

The present invention according to a tenth aspect is that, in the present invention according to the eighth or ninth aspect, at least one bed portion unit of the plurality of bed portion units has the plurality of mobile bodies, wherein the movable member driving unit can make the plurality of mobile bodies move independently from each other.

The present invention according to an eleventh aspect is that, in the present invention according to the eighth or ninth aspect, at least one bed portion unit of the plurality of bed portion units has the plurality of mobile bodies, wherein the movable member driving unit can make the plurality of mobile bodies belonging to the common bed portion unit move simultaneously.

The present invention according to the twelfth aspect is that, in the present invention according to the eighth or ninth aspect, each of at least two bed portion units of the plurality of bed portion units has the plurality of mobile bodies, wherein the movable member driving unit can make the plurality of mobile bodies belonging to one of the at least two bed portion units perform a motion different from the plurality of mobile bodies belonging to the other one of the at least two bed portion units.

The present invention according to a thirteenth aspect is that, in the present invention according to any one of the eighth to twelfth aspects, at least one of the bed portion unit driving unit and the movable member driving unit is configured such that a rotational driving force is transmitted from a rotational driver mounted to a distal end portion of a robot arm.

The present invention according to a fourteenth aspect is that, in the present invention according to the thirteenth aspect, at least one of the bed portion unit driving unit and the movable member driving unit has a plurality of rotated drivers selectively and separably connected to the rotational driver, and the plurality of rotated drivers are installed corresponding to motions of the bed portion unit and/or the movable members different from each other, respectively.

The present invention according to a fifteenth aspect is that, in the preset invention according to any one of the eighth to fourteenth aspects, the movable member is arranged such that the movable bed surface is normally positioned at the same level as the fixed bed surface or at a level lower than the fixed bed surface.

The present invention according to a sixteenth aspect is a nursing bed having a bed portion on which a care receiver lies, comprising: a movable member forming at least a part of the bed portion; a movable member driving unit for making the movable member move; a posture information acquisition unit for acquiring a posture information about a posture of the care receiver lying on the bed portion; and a control unit for controlling the movable member driving unit based on the posture information acquired by the posture information acquisition unit so as to change the posture of the care receiver into a predetermined posture by a motion of the movable member.

The present invention according to a seventeenth aspect is that, in the present invention according to the sixteenth aspect, the control unit analyzes a current posture information acquired by the posture information acquisition unit and a posture information of the predetermined posture as a target, and makes the movable member move multiple times so as to gradually make a difference between the current posture and the predetermined posture of the care receiver smaller.

The present invention according to an eighteenth aspect is that, in the present invention according to the sixteenth or seventeenth aspect, the posture information acquisition unit acquires the posture information by imaging the care receiver.

The present invention according to a nineteenth aspect is that, in the present invention according to any one of the sixteenth to eighteenth aspects, the movable member driving unit is configured such that a rotational driving force is transmitted from a rotational driver mounted to a distal end portion of a robot arm.

The present invention according to a twentieth aspect is that, in the present invention according to the nineteenth aspect, the movable member driving unit has a plurality of rotated drivers selectively and separably connected to the rotational driver, and the plurality of rotated drivers are installed corresponding to motions of the movable members different from each other, respectively.

The present invention according to a twenty-first aspect is that, in the present invention according to any one of the sixteenth to twentieth aspects, the movable member is arranged such that the movable bed surface is normally positioned at the same level as the fixed bed surface or at a level lower than the fixed bed surface.

The present invention according to a twenty-second aspect is a nursing bed having a bed portion on which a care receiver lies, comprising: a movable member forming at least a part of the bed portion; and a movable member driving unit for making the movable member move; the nursing bed being configured as a module type such that the movable member and the movable member driving unit can be detachably mounted to a desired position of the whole bed portion.

The present invention according to a twenty-third aspect is that, in the present invention according to the twenty-second aspect, the movable member driving unit is configured such that a rotational driving force is transmitted from a rotational driver mounted to a distal end portion of a robot arm.

The present invention according to a twenty-fourth aspect is that, in the present invention according to the twenty-third aspect, the movable member driving unit has a plurality of rotated drivers selectively and separably connected to the rotational driver, and the plurality of rotated drivers are installed corresponding to motions of the movable members different from each other, respectively.

The present invention according to a twenty-fifth aspect is that, in the present invention according to any one of the twenty-second to twenty-fourth aspects, the movable member is arranged such that the movable bed surface is normally positioned at the same level as the fixed bed surface or at a level lower than the fixed bed surface.

The present invention according to a twenty-sixth aspect is a nursing bed having a bed portion on which a care receiver lies, comprising: a movable member forming at least a part of the bed portion; and a movable member driving unit for making the movable member move; wherein the movable member driving unit is configured such that a rotational driving force is transmitted from a rotational driver mounted to a distal end portion of a robot arm, wherein the movable member driving unit has a plurality of rotated drivers selectively and separably connected to the rotational driver, and wherein the plurality of rotated drivers are installed corresponding to motions of the movable members different from each other, respectively.

Effect of the Invention

By a nursing bed according to the present invention, the posture of a care receiver lying on the bed can be changed into his/her optimal position without difficulty.

BRIEF DESCRIPTION OF THE DRAWINGS

FIG. 42 illustrates control parameters concerning motions of the nursing bed in FIG. 40.

EMBODIMENT OF THE INVENTION

Hereunder, a nursing bed according to one embodiment of the present invention will be described with reference to the drawings.

Figure 1:
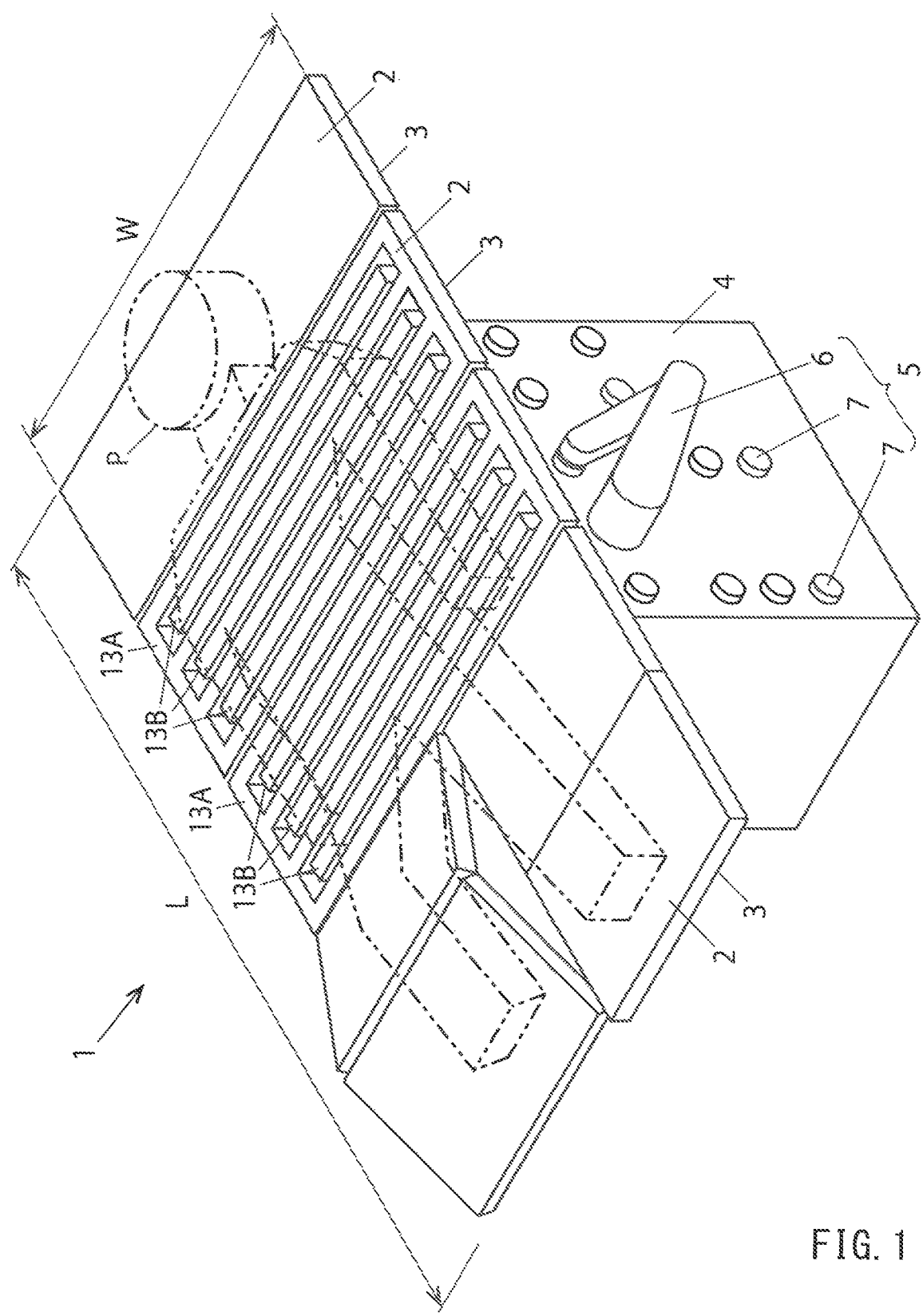
FIG. 1 is a perspective view illustrating a nursing bed according to one embodiment of the present invention.
Figure 2:
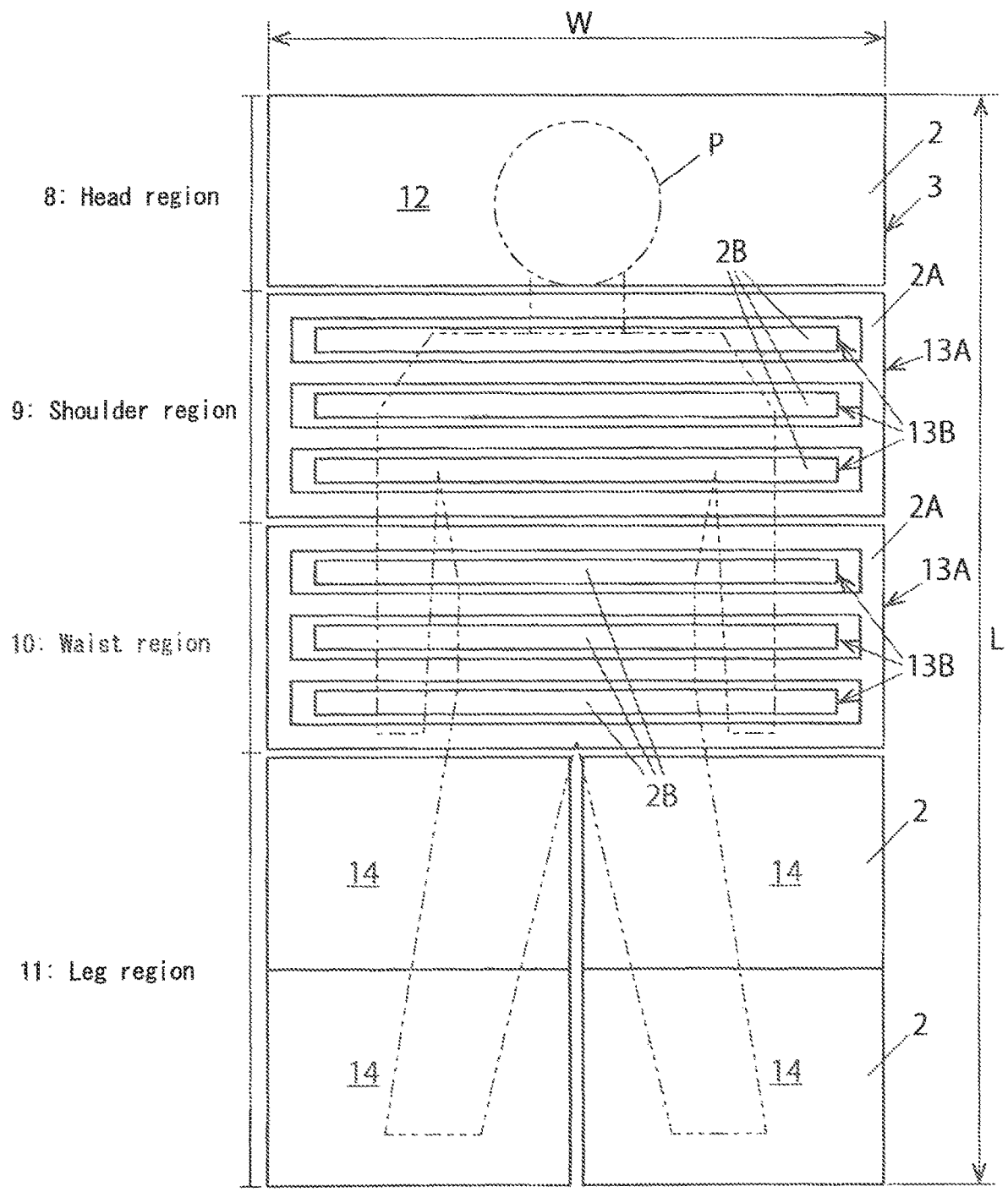
FIG. 2 is a plan view schematically illustrating the nursing bed in FIG. 1.

As illustrated in FIG. 1 and FIG. 2, a nursing bed 1 according to this embodiment has a dimension L in the longitudinal direction and a dimension W in the lateral direction. The longitudinal dimension L and the lateral dimension W correspond to a longitudinal dimension and a lateral dimension of a bed portion 3 forming a bed surface 2 on which a care receiver P lies.

The bed portion 3 is arranged above a bed base 4, and a driving mechanism 5 for moving at least a part of the bed portion 3 is provided to the bed base 4. At least a part of the driving mechanism 5 corresponds to a movable member driving unit in the present invention.

As illustrated in FIG. 2, the bed portion 3 of the nursing bed 1 is divided into a head region 8, a shoulder region 9, a waist region 10, and a leg region 11 along the longitudinal direction. The head region 8 of the bed portion 3 is formed of an integrated plate-like square member 12.

The shoulder region 9 and the waist region 10 in the center portion in the longitudinal direction of the bed portion 3 comprise a fixed member 13A forming a fixed bed surface 2A and movable members 13B movable relative to the fixed member 13A and forming a movable bed surface 2B, respectively. The fixed member 13A is structured so that a plurality of slender members extending in the lateral direction are connected by a pair of left and right edge members extending in the longitudinal direction. The movable members 13B are configured by a plurality of slender mobile bodies arranged in intervals between a plurality of slender members of the fixed member 13A. Intervals are ensured over the whole periphery between the inner peripheral surfaces forming the intervals in the fixed member 13A and the outer peripheral surfaces of the movable members 13B.

The plurality of mobile bodies (movable members) 13B can be, via the intervals of the plurality of slender members of the fixed member 13A, protruded upward relative to the fixed bed surface 2A and moved in the lateral direction in the intervals of the fixed member 13A by means of the driving mechanism 5. The mobile bodies 13B belonging to the shoulder region 9 and the mobile bodies 13B belonging to the waist region 10 can be driven independently from each other by the driving mechanism 5. Additionally, the plurality of mobile bodies 13B belonging to the shoulder region 9 are integrally driven by the driving mechanism 5. Similarly, the plurality of mobile bodies 13B belonging to the waist region 10 are integrally driven by the driving mechanism 5.

The leg region 11 is composed of a part corresponding to the right leg and a part corresponding to the left leg. The part corresponding to the right leg is configured by a pair of movable rectangular pieces 14 juxtaposed in the longitudinal direction, and also the part corresponding to the left leg is configured by a pair of movable rectangular pieces 14 juxtaposed in the longitudinal direction, either.

The part corresponding to the right leg and the part corresponding to the left leg in the leg region 11 are pressed up at their center portions by the driving mechanism 5 respectively so as to be raised and deformed into a V shape as illustrated in FIG. 1. Thereby, the right leg or the left leg of the care receiver P can be pressed up from his/her knee back to be bent.

Figure 3:
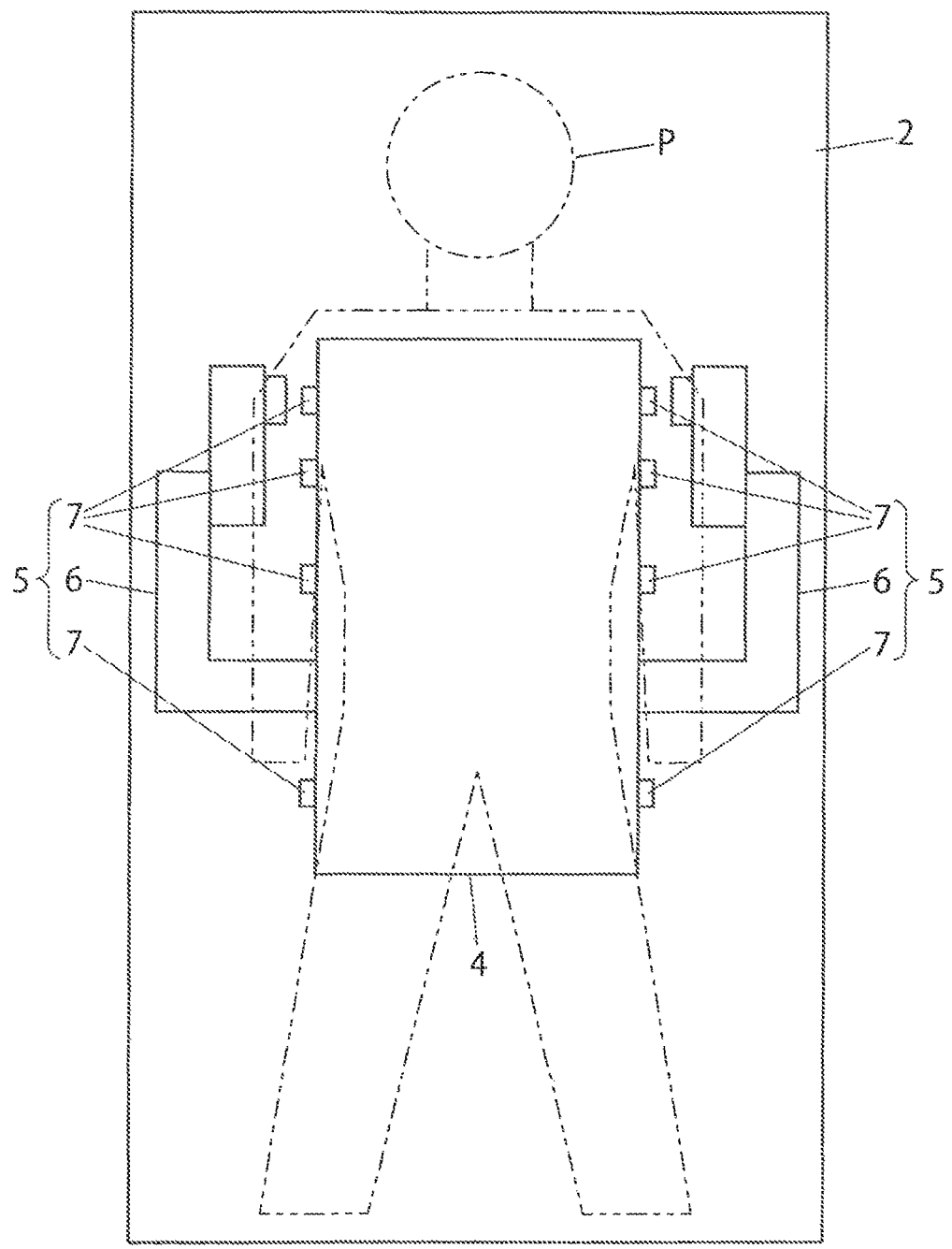
FIG. 3 is a plan view schematically illustrating a bed base and a driving mechanism of the nursing bed in FIG. 1.

As illustrated in FIG. 3, two robots (two robot arms 6) are incorporated in the bed base 4, and each robot arm 6 can be driven independently. Note that, in FIG. 3, the bed base 4 is shown relatively small in order to show the configuration of the driving mechanism 5 clearly.

Figure 4:
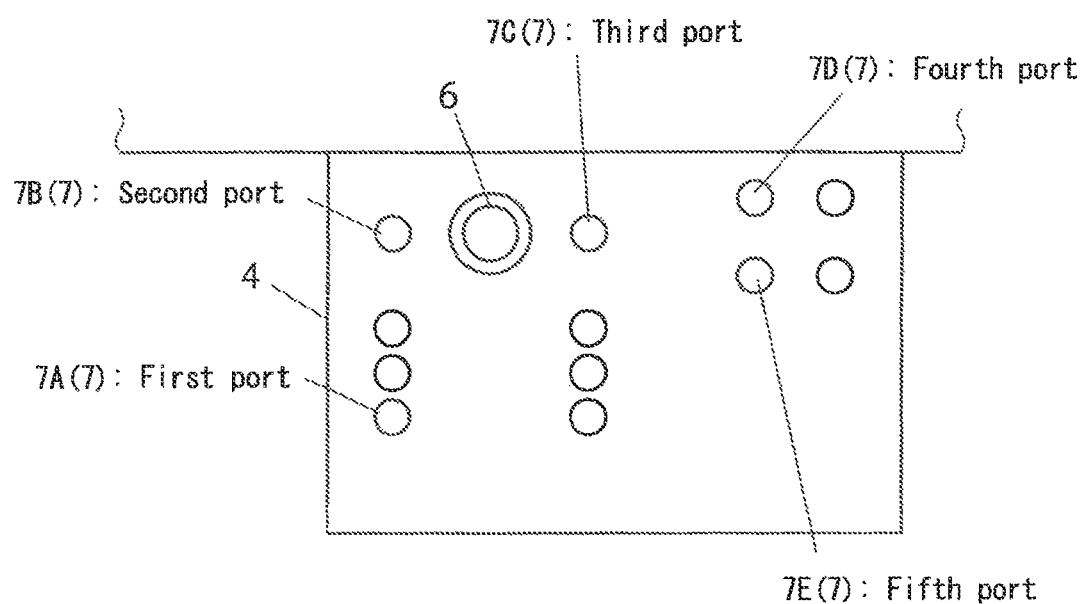
FIG. 4 is a side view illustrating the function of each driving force input port of the driving mechanism of the nursing bed in FIG. 1.

As illustrated in FIG. 4, the driving mechanism 5 provided to the bed base 4 comprises a robot arm 6 and a plurality of driving force input ports (rotated drivers) 7 to which a distal end portion of this robot arm is selectively connected. The plurality of driving force input ports 7 (7A, 7B, 7C, 7D, 7E) correspond to moving motions in the bed portion 3 different from each other, respectively.

Next, motions of the mobile body 13B when changing the posture of the care receiver P on the nursing bed 1 will be described referring to FIG. 5 and FIG. 6.

As illustrated in FIG. 5(a), the mobile body 13B is normally arranged so that the movable bed surface 2B is positioned at the same level as the fixed bed surface 2A. Thus, normally, the movable bed surface 2B and the fixed bed surface 2A are positioned at the same level, configuring the bed surface 2 in a common plane.

The mobile body 13B is lowered from the state in FIG. 5(a) to the state in FIG. 5(b) by the driving mechanism 5. At this time, since the body of the care receiver P is supported by the fixed bed surface 2A of the fixed member 13A, it is held at the level of the fixed bed surface 2A.

Next, as illustrated in FIG. 5(c), the mobile body 13B is moved to one side in the lateral direction by the driving mechanism 5, utilizing a lateral interval between the fixed member 13A and the mobile body 13B. At this time, since the mobile body 13B is away from the body of the care receiver P, it can be moved smoothly without causing discomfort for the care receiver P.

Next, the mobile body 13B is elevated as illustrated in FIG. 5(d) by the driving mechanism 5. Thereby, the body of the care receiver P is pressed up by the movable bed surface 2B of the mobile body 13B and elevated away from the fixed bed surface 2A.

Next, as illustrated in FIG. 6(a), the mobile body 13B is moved to another side in the lateral direction by the driving mechanism 5, utilizing a lateral interval between the fixed member 13A and the mobile body 13B. Thereby, the body of the cars receiver P is also moved together with the mobile body 13B. At this time, since the body of the care receiver P is away from the fixed bed surface 2A, it can be moved smoothly without causing discomfort for the care receiver P.

Next, the mobile body 13B is lowered to a position lower than the fixed bed surface 2A as illustrated in FIG. 6(b) by the driving mechanism 5. Thereby, the body of the care receiver P is placed on the fixed bed surface 2A.

Next, as illustrated in FIG. 6(c), the mobile body 13B is moved to one side in the lateral direction by the driving mechanism 5. At this time, since the mobile body 13B is away from the body of the care receiver P, it can be moved smoothly without causing discomfort for the care receiver P.

Next, as illustrated in FIG. 6(d), the mobile body 13B is elevated up to the level of the fixed bed surface 2A by the driving mechanism 5. Thereby, the movable bed surface 2B of the mobile body (movable member) 13B and the fixed bed surface 2A of the fixed member 13A become flush with each other, and the both form the bed surface 2 in a common plane.

By repeating the above-mentioned rotational motion of the mobile body 13B, the body of the care receiver P can be moved little by little locally (for example, only shoulder portion, or only waist portion) to the left (or to the right).

The above-mentioned posture changing motion can be performed in the shoulder region 9 and the waist region 10 independently from each other. For example, first the shoulder portion of the care receiver P can be moved in the shoulder region 9, and after that, the waist portion of the care receiver P can be moved in the waist region 10.

According to the nursing bed 1 of this embodiment, by repeating the rotational motion of the mobile body 13B, the body of the care receiver P can be moved little by little locally (for example, only shoulder portion, or only waist portion) so as to change his/her posture into the optimal one without difficulty.

Further, according to the nursing bed 1 of this embodiment, there is an interval between the fixed member 13A and the mobile body (movable member) 13B in the horizontal direction and nothing is filled in this interval, and therefore a large moving stroke of the mobile body 13B in the horizontal direction can be secured, and also a filler in the interval would never protrudes upward accompanying the horizontal movement of the mobile body 13B.

Note that, a plurality of mobile bodies 13B belonging to the shoulder region 9 may be moved simultaneously or the plurality of mobile bodies 13B belonging to the shoulder region 9 may be driven individually. Additionally, the plurality of mobile bodies 13B belonging to the shoulder region 9 may be divided into several groups so as to drive the plurality of mobile bodies 13B belonging to each group simultaneously. The same applies to a plurality of mobile bodies 13B belonging to the waist region 10.

Figure 7:
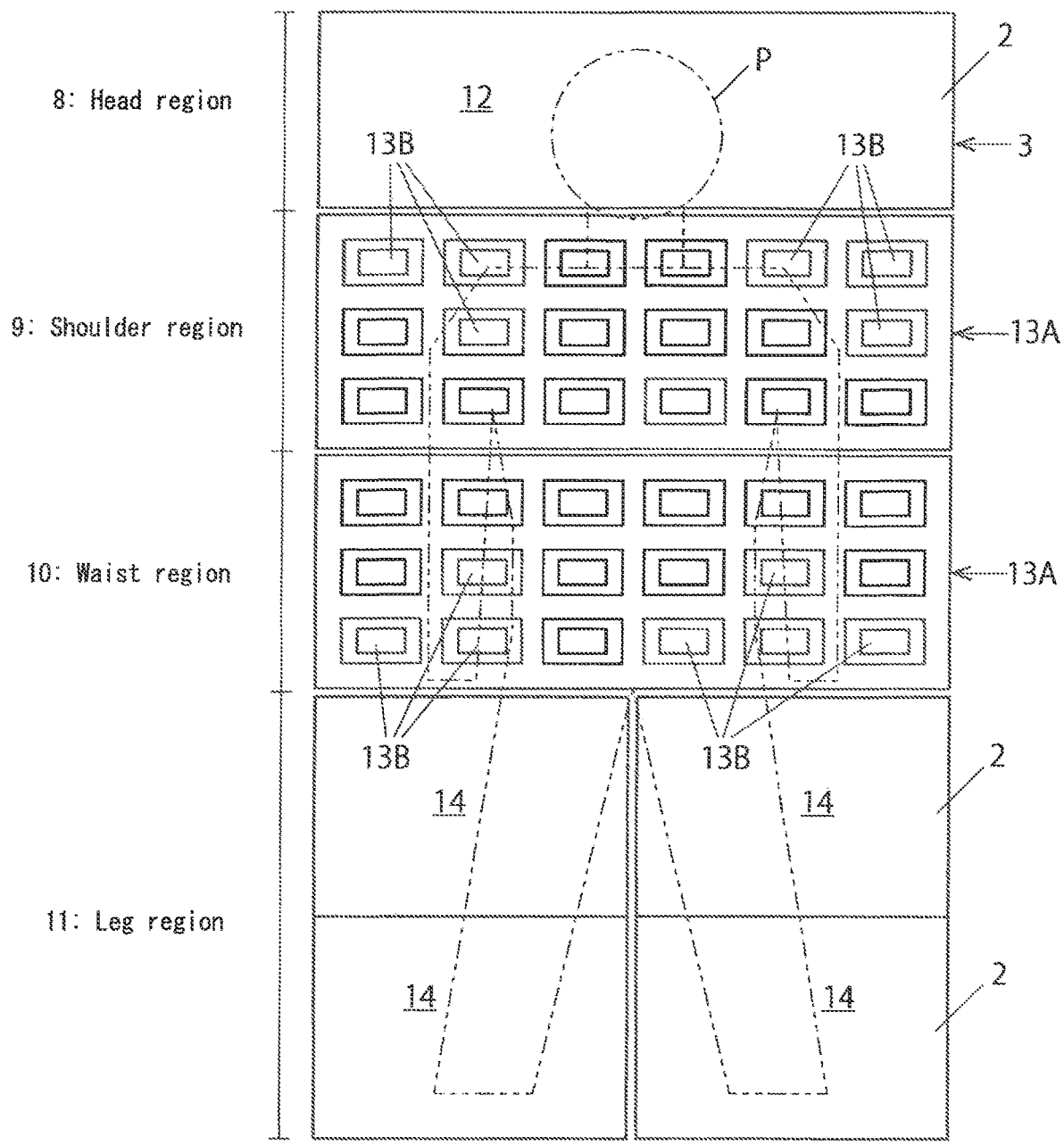
FIG. 7 is a plan view schematically illustrating a variation of the nursing bed in FIG. 1.

FIG. 7 illustrates a variation of the embodiment in FIG. 1. In this variation, the fixed member 13A configuring a part of the bed portion 3 is formed in a lattice shape by a plurality of slender members extending in the longitudinal direction and the lateral direction. A plurality of mobile bodies (movable members) 13B configuring another part of the bed portion 3 are movably arranged in each opening of the lattice-shaped fixed member 13A.

Also in this variation, by moving the mobile bodies 13B by the driving mechanism 5 so as to make them perform the rotational motion, the body of the care receiver P can be moved little by little locally so as to change his/her posture into the optimal one without difficulty.

Additionally, also in this variation, a plurality of mobile bodies 13B belonging to the shoulder region 9 may be driven simultaneously so as to make them perform the rotational motion or they may be driven individually so as to make them perform the rotational motion. Alternatively, the plurality of mobile bodies 13B belonging to the shoulder region 9 may be divided into several groups so as to drive the plurality of mobile bodies 13B belonging to each group simultaneously and make them perform the rotational motion. The same applies to a plurality of mobile bodies 13B belonging to the waist region 10.

Figure 8:
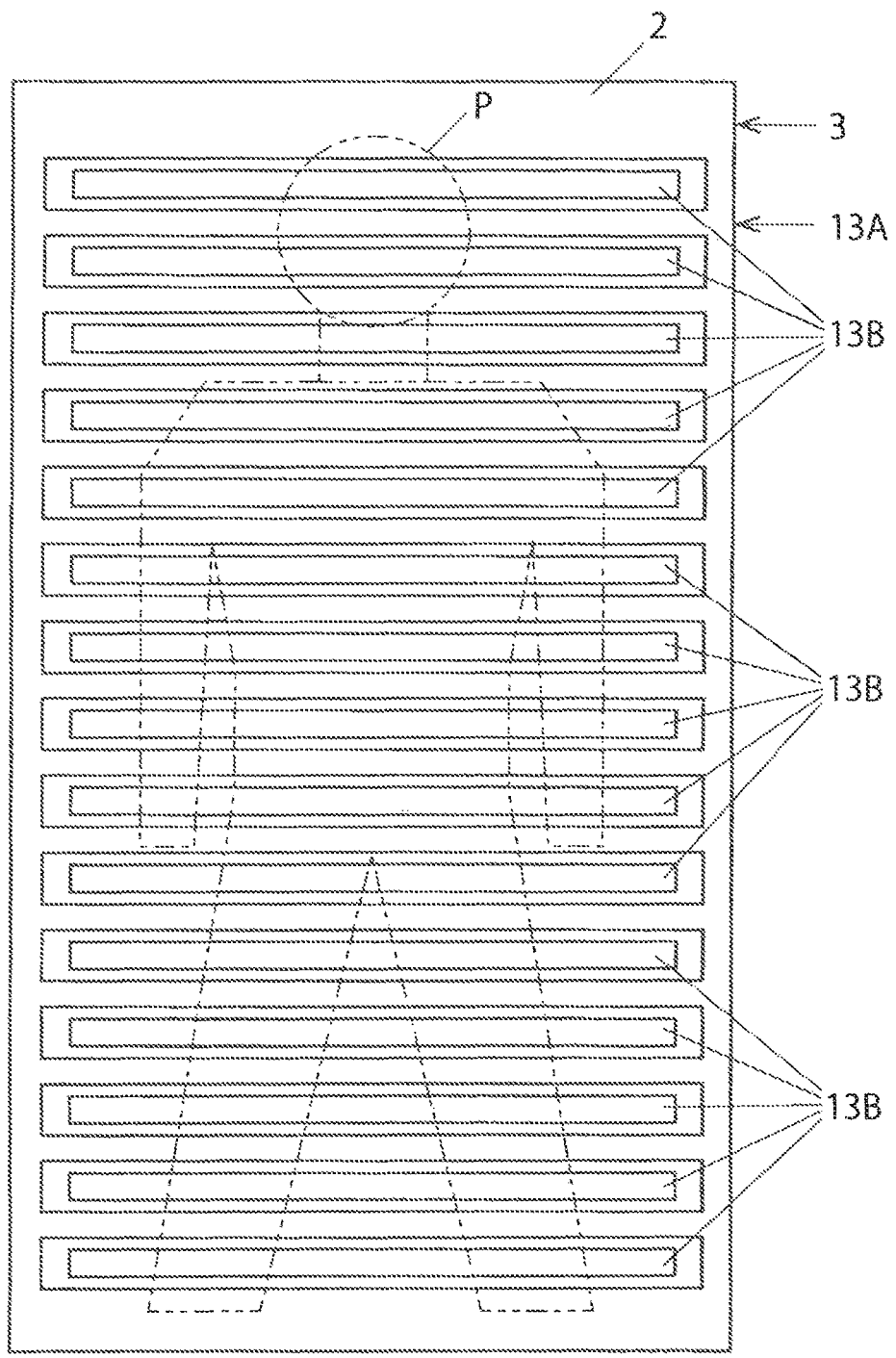
FIG. 8 is a plan view schematically illustrating another variation of the nursing bed in FIG. 1.
Figure 9:
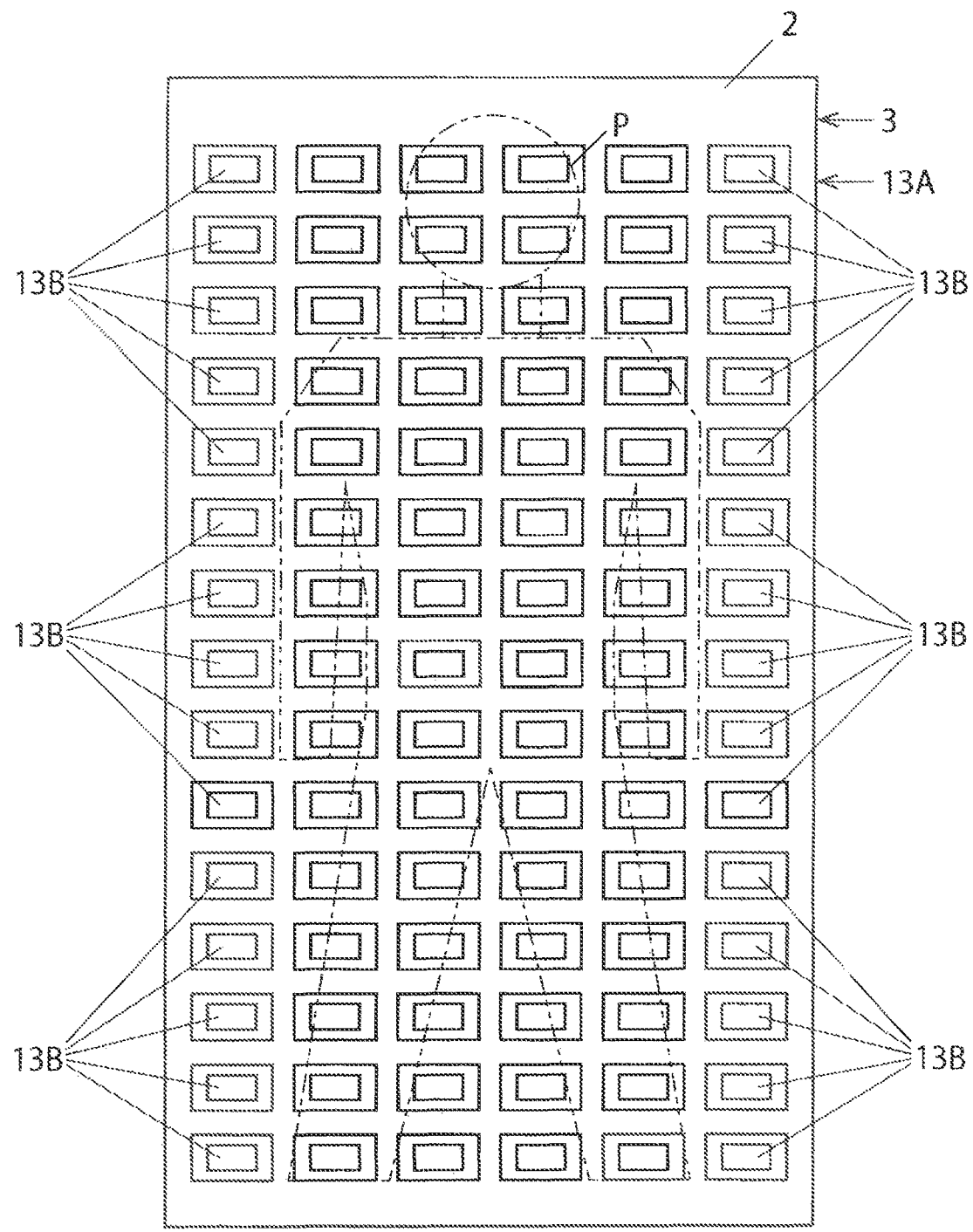
FIG. 9 is a plan view schematically illustrating another variation of the nursing bed in FIG. 1.

FIG. 8 illustrates another variation of the embodiment in FIG. 1. In this variation, the whole bed portion 3 of the nursing bed 1 is configured by a slit-shaped fixed member 13A and a plurality of slender mobile bodies (movable members) 13B.

In this variation, the plurality of mobile bodies 13B are divided into several groups and the plurality of mobile bodies 13B belonging to each group are driven simultaneously so as to make them perform the rotational motion. Alternatively, the plurality of mobile bodies 13B may be individually driven respectively so as to make them perform the rotational motion.

In this variation, the whole body of the care receiver P can be moved by the mobile bodies 13B little by little locally so as to change his/her posture into the optimal one without difficulty.

FIG. 3 illustrates another variation of the embodiment in FIG. 1. In this variation, the whole bed portion 3 of the nursing bed 1 is configured by a lattice-shaped fixed member 13A and a plurality of mobile bodies (movable members) 13B.

Also in this variation, the plurality of mobile bodies 13B are divided into several groups and the plurality of mobile bodies 13B belonging to each group are driven simultaneously so as to make them perform the rotational motion. Alternatively, the plurality of mobile bodies 13B may be individually driven respectively so as to make them perform the rotational motion.

Also in this variation, the whole body of the care receiver P can be moved by the mobile bodies 13B little by little locally so as to change his/her posture into the optimal one without difficulty.

Next, an internal structure of the driving mechanism 5 of the nursing bed 1 according to the embodiment in FIG. 1 will be described.

Figure 10:
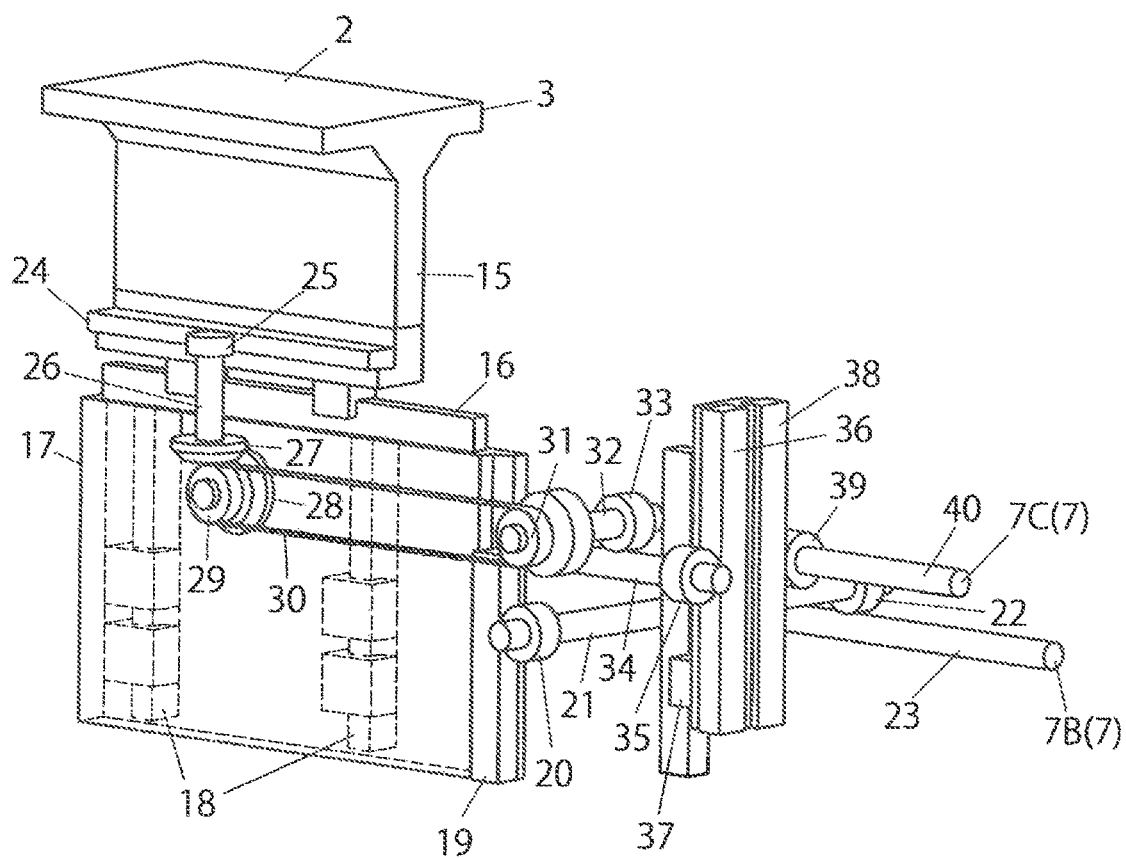
FIG. 10 is a perspective view illustrating a driving mechanism for a waist portion and a shoulder portion of the nursing bed in FIG. 1.

As illustrated in FIG. 10, the driving mechanism 5 comprises a support base portion 15 whose upper end is provided with (a part of) the bed portion 3. Note that, in FIG. 10, (a part of) the bed portion 3 composed of a plurality of mobile bodies (movable members) 13B is schematically illustrated as an integrated object.

A lower end portion of the support base portion 15 is supported by a linear motion support member (linear guide) 16. Thereby, the support base portion 15 can move horizontally in the lateral direction of the bed. The linear motion support member 16 supporting the support base portion 15 is provided to an upper end of a movable support plate 17. The movable support plate 17 is supported so as to be moved vertically by a pair of linear motion support members (linear guide) 18 which are extendedly arranged in the vertical direction.

A rack 19 is extendedly arranged in the vertical direction on one side end portion of the movable support plate 17, and a pinion 20 is engaged with the rack 19. This pinion 20 is provided to one end of a connection shaft 21, and a wheel of a worm gear 22 is provided to the other end of the connection shaft 21. This wheel of the worm gear 22 is engaged with a worm of the worm gear 22, and this worm is formed in an input shaft 23 whose distal end portion forms a driving force input port 7. This driving force input port 7 is an input portion of rotational power for vertically moving the bed portion 3.

A rack 24 is provided to a lower end portion of the support base portion 15, and a pinion 25 is engaged with this rack 24. This pinion 25 is provided to an upper end of a connection shaft 26, and a bevel gear 27 is provided to a lower end of the connection shaft 26. This bevel gear 27 is engaged with a bevel gear 28 which is rotatably provided to the movable support plate 17.

A pulley 23 is integrally formed in the bevel gear 28 provided to the movable support plate 17, and a belt 30 is wound on this pulley 29. This belt 30 is wound on another pulley 31 which is provided to one end of a connection shaft 32, and a wheel of a worm gear 33 is provided to the other end of the connection shaft 32. The wheel of the worm gear 33 is engaged with the worm of the worm gear 33.

A pinion 35 is provided to an end portion of a connection shaft 34 where the worm of the worm gear 33 is formed, and this pinion 35 is engaged with a rack 36 extendedly arranged in the vertical direction. This rack 36 is supported so as to be moved vertically by a linear motion support member (linear guide) 37 extendedly arranged in the vertical direction. Another rack 38 is supported by this linear motion support member 37 integrally with the rack 36 so as to be moved vertically, and this rack 38 is engaged with a pinion 39.

This pinion 39 is provided to one end of an input shaft 40, and the other end of this input shaft 40 forms the driving force input port 7. This driving force input port 7 is an input portion of rotational power for horizontally moving the bed portion 3 in the lateral direction.

Figure 11:
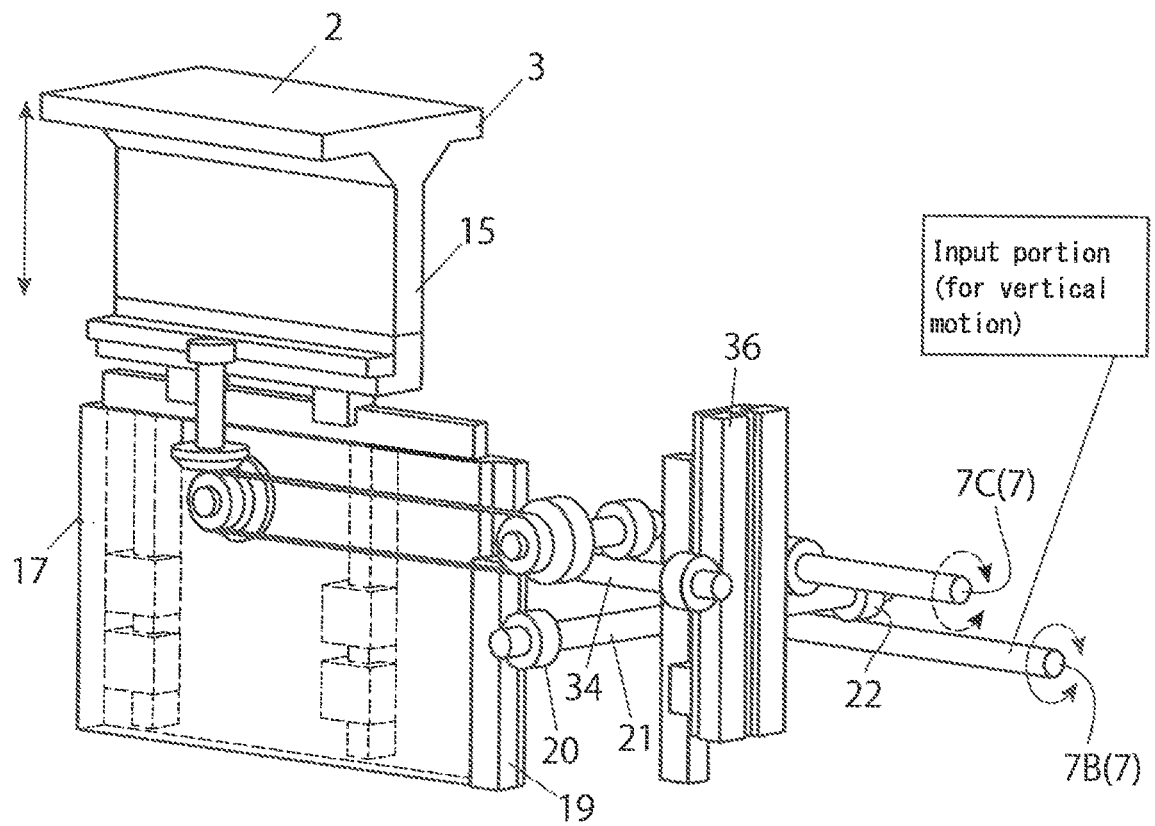
FIG. 11 is a perspective view illustrating the driving mechanism in FIG. 10 upon input rotation for vertical motion.

Next, motions for vertically moving the bed portion 3 of the nursing bed 1 will be described with reference to FIG. 11.

When a driving force input port 7B for vertical movement is rotated, its rotational power is transmitted to the connection shaft 21 via the worm gear 22. Then, the pinion 20 is rotated integrally with the connection shaft 21, and the rack 19 is moved in the vertical direction by the rotation of the pinion 20. Since the rack 19 is fixed to the movable support plate 17, the movable support plate 17 is moved in the vertical direction together with the rack 19. Thereby, the bed portion 3 is moved in the vertical direction together with the support base portion 15.

Note that, since the connection shaft 34 is vertically moved integrally with the movable support plate 17, the rack 36 is also moved vertically at the same time. At this time, a driving force input port 7C for lateral movement is rotated, which causes no problem since this driving force input port 7C for lateral movement is free.

Additionally, since the worm gear 22 has a structure which cannot be rotated from the output side, even when an applied torque of the driving force input port 7B for vertical movement is removed, its posture at the time can be kept.

Figure 12:
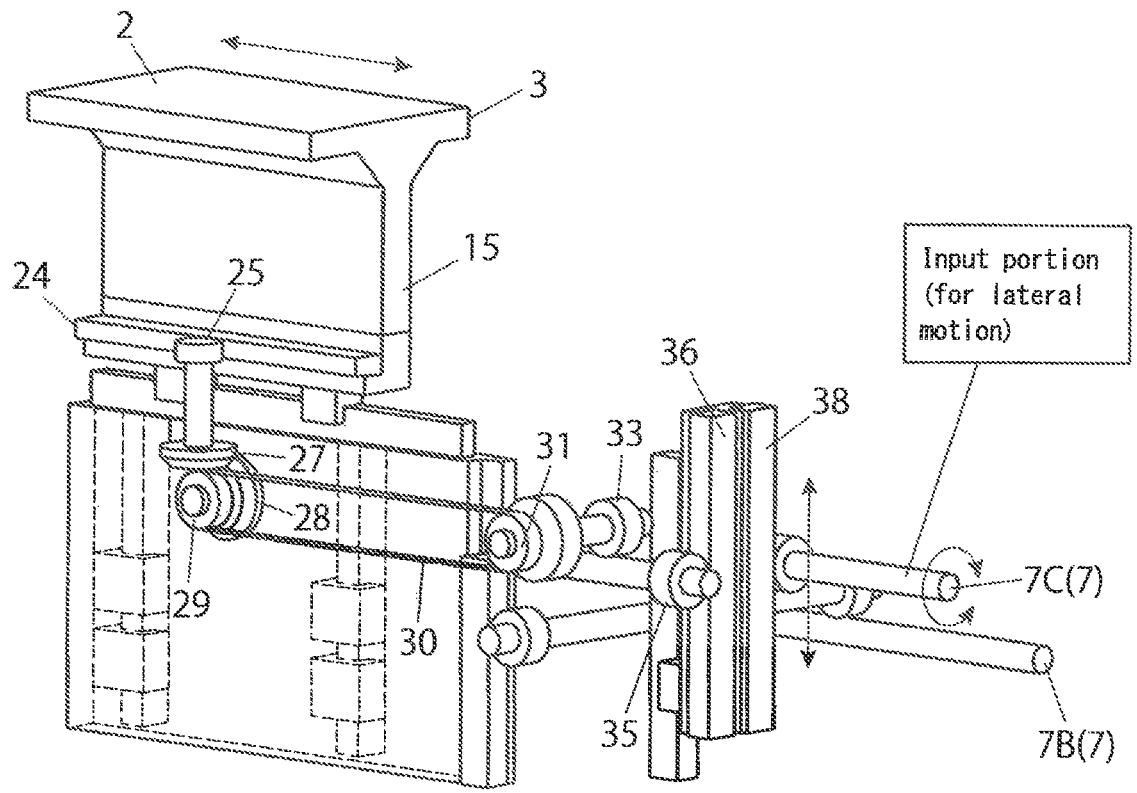
FIG. 12 is a perspective view illustrating the driving mechanism in FIG. 10 upon input rotation for lateral motion.

Next, motions for horizontally moving the bed portion 3 of the nursing bed 1 in the lateral direction will be described with reference to FIG. 12.

When the driving force input port 7C for lateral movement is rotated, this rotational force is transmitted to the rack 38, and the rack 38 is moved in the vertical direction together with the other rack 36. The pinion 35 is rotated according to the vertical movement of the rack 36, and this rotational force is transmitted to the pulley 31 via the worm gear 33.

When the pulley 31 is rotated, the other pulley 29 is rotated at the same time via the belt 30. Thereby, the bevel gear 28 integrally provided to the pulley 29 is rotated, and the bevel gear 27 engaged with this bevel gear 28 is rotated.

When the bevel gear 27 is rotated, the pinion 25 is rotated at the same time, and the rack 24 is moved in the lateral direction by this rotation of the pinion 25. As a result, the bed portion 3 is horizontally moved in the lateral direction together with the support base portion 15.

Note that, since the worm gear 33 has a structure which cannot be rotated from the output side, even when an applied torque of the driving force input port 7C for lateral movement is removed, its posture at the time can be kept.

Figure 13:
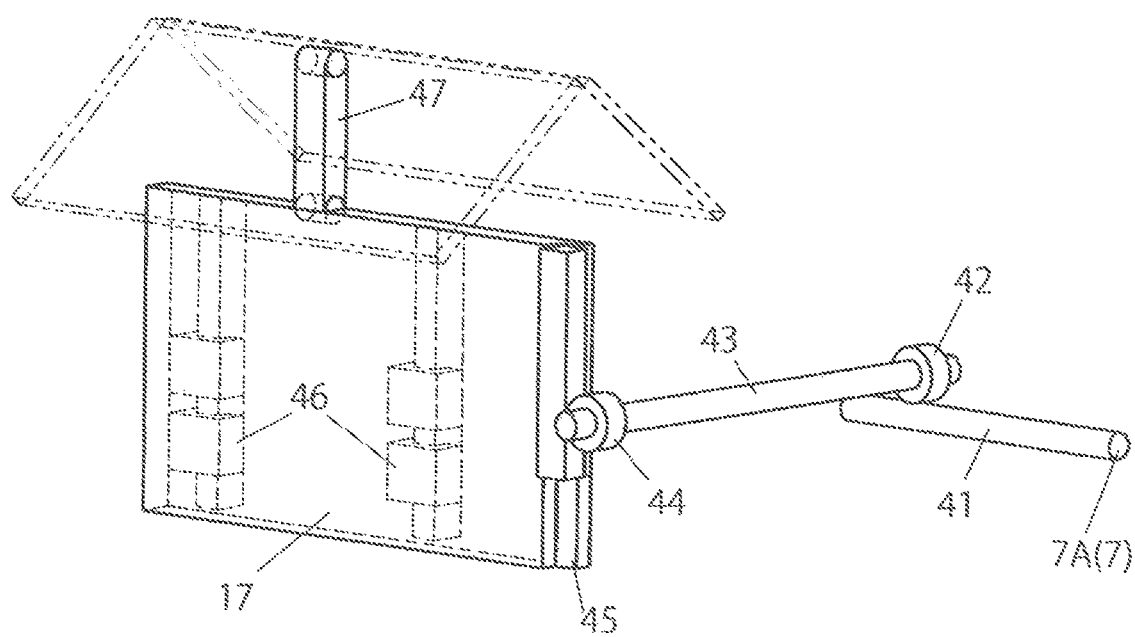
FIG. 13 is a perspective view illustrating a driving mechanism for a leg region of the nursing bed in FIG. 1.

FIG. 13 illustrates a driving mechanism for the leg portion for pressing up the movable rectangular piece 14 configuring the leg region 11 from below. In this driving mechanism for the leg portion, when a driving force input port 7A (7) for the leg portion is rotated, an input shaft 41 where this driving force input port 7A is formed in a distal end portion thereof is rotated.

A worm configuring a worm gear 42 is formed in this input shaft 41 so that power is transmitted to a wheel also configuring the worm gear 42. The wheel of the worm gear 42 is provided to one end of a connection shaft 43, and a pinion 44 is provided to the other end of this connection shaft 43.

The pinion 44 is engaged with a rack 45 which is provided to a side end portion of the movable support plate 17. The movable support plate 17 is supported so as to be moved vertically by a pair of linear motion support members (linear guide) 46 extendedly arranged in the vertical direction.

The rack 45 is moved vertically by a rotation of the pinion 44, and thereby the movable support plate 17 is moved vertically. A lower end portion of a pressing-up member 47 is fixed to an upper end portion of the movable support plate 17, and the movable rectangular piece 14 is pressed up from below the same by an upper end portion of this pressing-up member 47.

Figure 14:
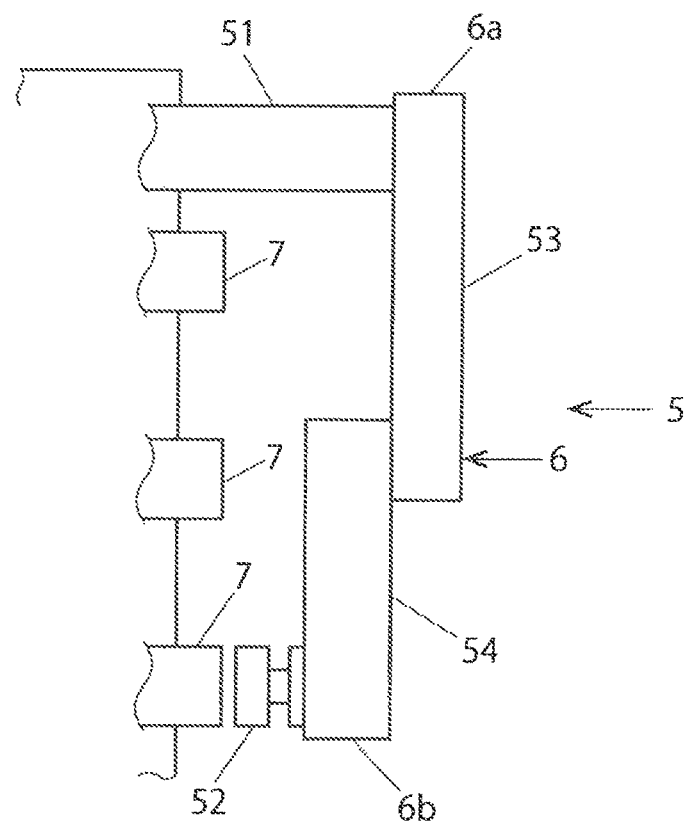
FIG. 14 is a side view illustrating how a rotation power is connected to the driving force input port of the driving mechanism of the nursing bed in FIG. 1.
Figure 15:
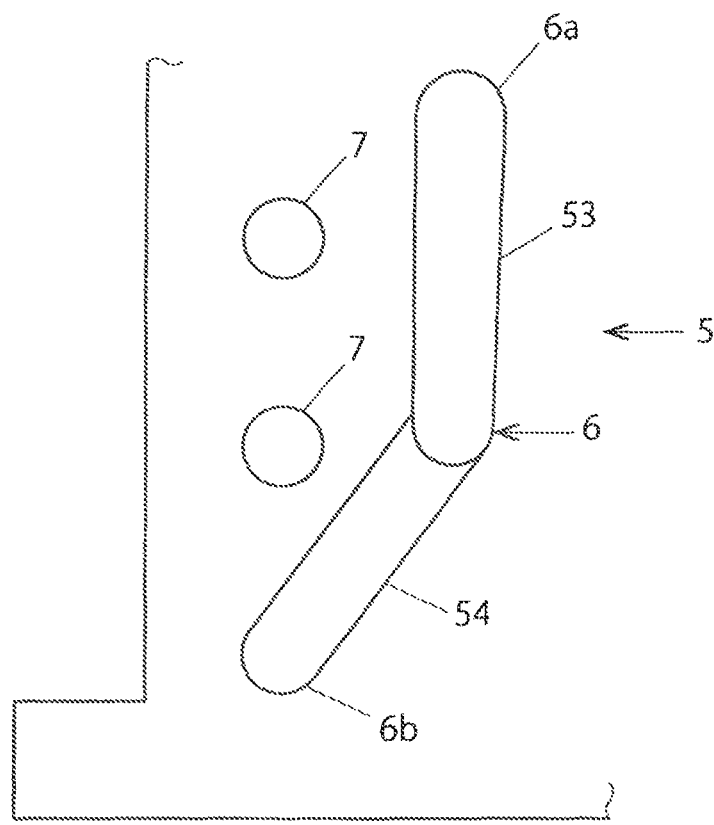
FIG. 15 is a front view illustrating how a rotation power is connected to the driving force input port of the driving mechanism of the nursing bed in FIG. 1.

As illustrated in FIG. 14 and FIG. 15, the robot arm 6 has a proximal end portion 6a and a distal end portion 6b, and the proximal end portion 6a of the robot arm 6 is mounted to an upper end portion of a robot main shaft 51. A rotational driver 52 is rotatably provided to the distal end portion 6b of the robot arm 6.

The robot arm 6 has a proximal end side link member 53 and a distal end side link member 54. A proximal end portion of the proximal end side link member 53 configures the proximal end portion 6a of the robot arm, and a distal end portion of the distal end side link member 54 configures the distal end portion 6b of the robot arm 6. A distal end portion of the proximal end side link member 53 and a proximal end portion of the distal end side link member 54 are rotatably connected with each other.

Figure 16:
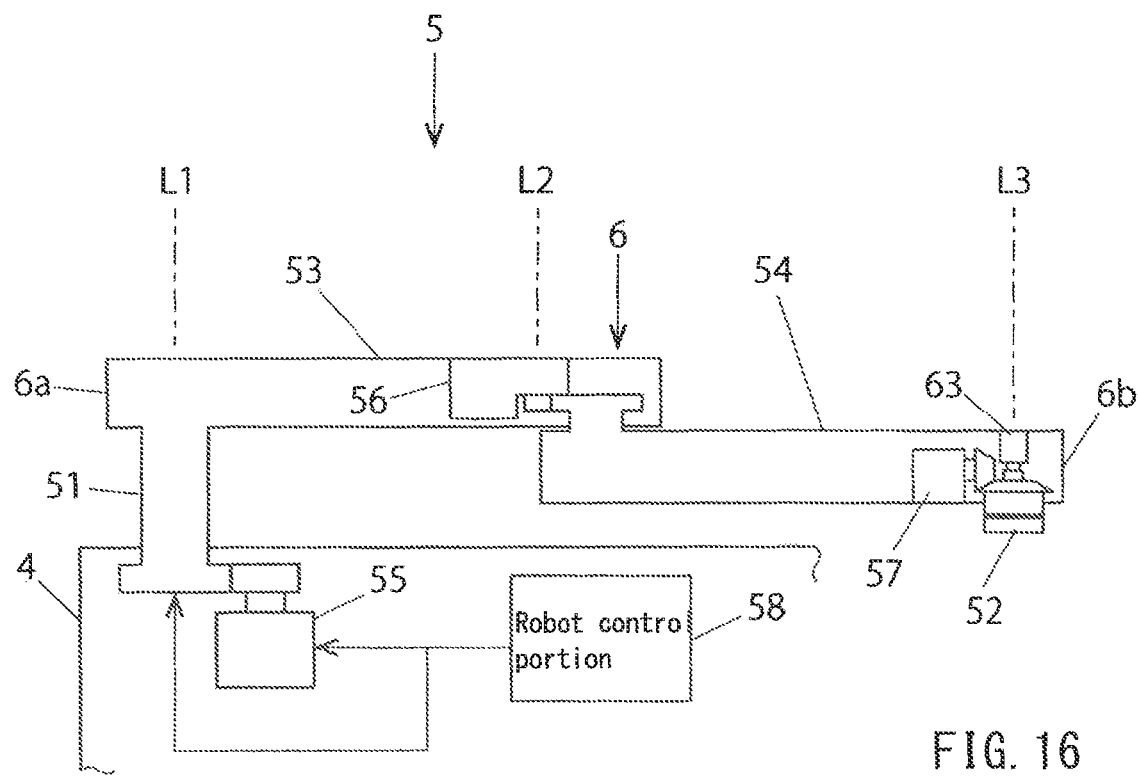
FIG. 16 is a sectional view illustrating an internal structure of a robot arm of the driving mechanism of the nursing bed in FIG. 1.

As illustrated in FIG. 16, a driving motor 55 for the robot main shaft 51 is provided inside the bed base 4, and the robot main shaft 51 is rotationally driven about a first axis L1 by this driving motor 55.

A driving motor 56 for the distal end side link member 53 is provided inside the proximal end side link member 53, and the distal end side link member 54 is rotationally driven about a second axis L2 by this driving motor 56.

A driving motor 57 for the rotational driver 52 is provided inside the distal end side link member 54, and the rotational driver 52 is rotationally driven about a third axis L3 by this driving motor 57.

Note that the first axis L1, the second axis L2, and the third axis L3 are parallel to one another.

Rotations of the respective driving motors 55, 56, and 57 are controlled by a robot control portion 58. The robot control portion 58 can store a program particular to a care receiver P so as to realize a bedsore-prevention motion particular to said care receiver P.

Figure 17:
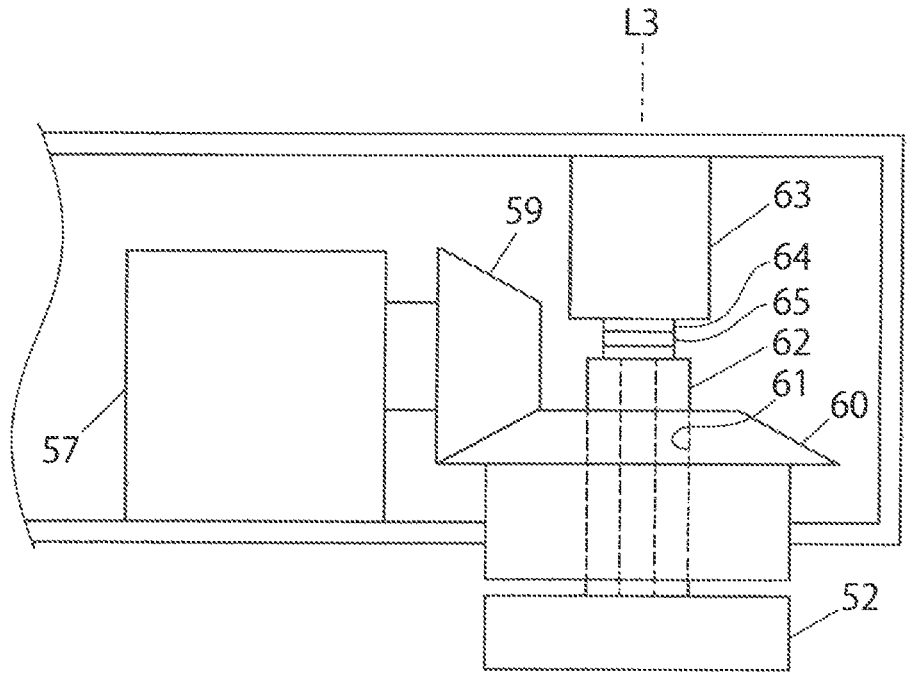
FIG. 17 is a sectional view illustrating an enlarged distal end portion of the robot arm in FIG. 16.

As illustrated in FIG. 17, a bevel gear 59 on the driving motor 57 side and a bevel gear 60 on the rotational driver 52 side are engaged with each other. A through hole 61 including a spline groove is formed at the center of the bevel gear 60 on the rotational driver 52 side, and a rotational driving shaft 62 is inserted through this through hole 61 so as to be moved along the third axis L3. This rotational driving shaft 62 is spline-fitted to the through hole of the bevel gear 60. Thereby, the rotational driving shaft 62 is prevented from rotating about the third axis L3 with respect to the bevel gear 60 and allowed to be linearly moved along the third axis L3.

The rotational driver 52 is mounted to one end portion of the rotational driving shaft 62, and a distal end portion of a piston 64 of an air cylinder 63 is connected to the other end portion of the rotational driving shaft 62 via a bearing 65. By driving the air cylinder 63 so as to advance the piston 64, the rotational driver 52 moves forward together with the rotational driving shaft 62 along the third axis L3.

When the driving motor 57 is driven, its rotational driving force is transmitted to the bevel gear 60 on the rotational driver 52 side from the bevel gear 59 on the driving motor 57 side. Since the rotational driving shaft 62 of the rotational driver 52 and the bevel gear 60 are spline-fitted to each other, the rotational driving force of the bevel gear 60 is transmitted to the rotational driving shaft 62, and thereby the rotational driver 52 is rotated integrally with the rotational driving shaft 62.

Next, a connection mechanism for connecting the driving force input port 7 on the bed base 4 side and the rotational driver 52 on the robot arm 6 side will be described with reference to FIG. 18 to FIG. 20.

When driving the air cylinder 63 so as to connect the rotational driver 52 on the distal end of the robot arm 6 to the driving force input port 7 on the bed base 4 side, it is necessary to absorb a positioning error of the rotational driver 52 to the driving force input port 7 and a deviation due to the mechanical tolerance (such as eccentricity) of the rotational driver 52 and the driving force input port 7, and this needs to be performed by means of coupling.

Figure 18:
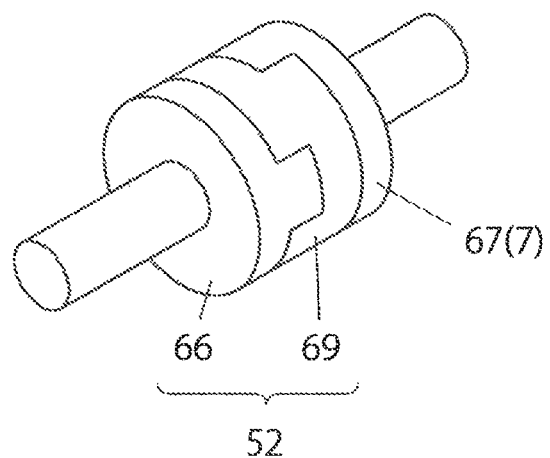
FIG. 18 is a perspective view illustrating a state that, in the driving mechanism of the nursing bed in FIG. 1, the driving force input port and a rotation driver on a distal end of the robot arm are connected.
Figure 19:
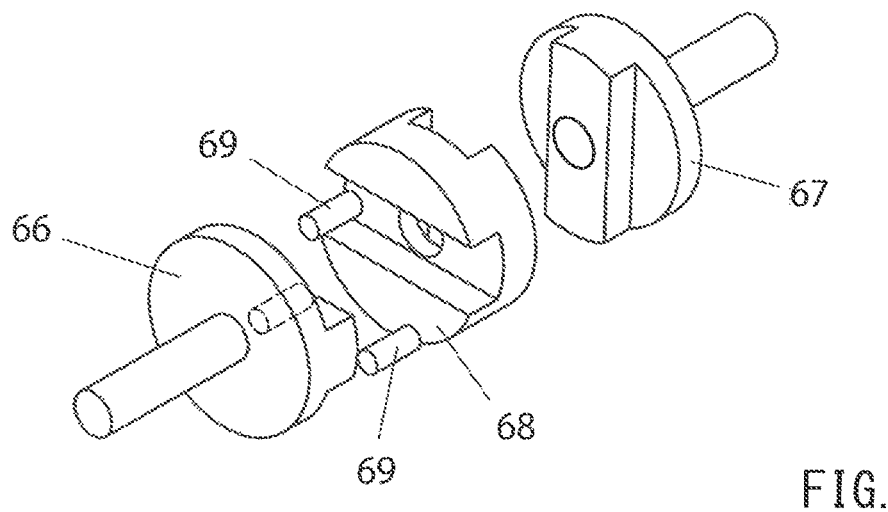
FIG. 19 is an assembly drawing illustrating the power connection portion of the nursing bed in FIG. 18.
Figure 20:
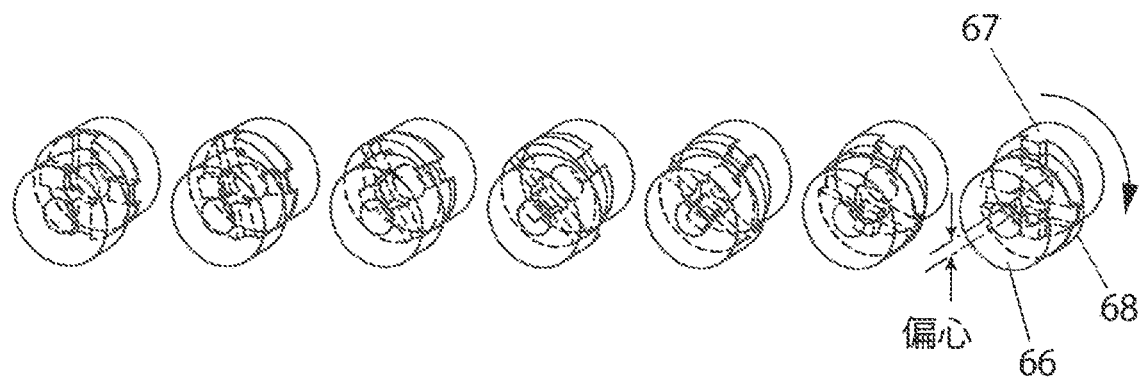
FIG. 20 illustrates how backlash (such as eccentricity) is absorbed upon connection in the power connection portion of the nursing bed in FIG. 18.

Thus, in this embodiment, an oldham coupling is employed as illustrated in FIG. 18 and FIG. 19 so as to absorb this deviation. Namely, in the oldham coupling, projections of its hubs 66, 67 slide on grooves of a slider 68 so as to absorb the deviation (refer to FIG. 20). Note that the hub 66 and the slider 68 configure the rotational driver 52, and the hub 67 configures the driving force input port 7.

Here, in the driving mechanism 5 of this embodiment, the slider 68 is mounted to the hub 66 on the robot arm 6 side to be free in the horizontal direction for attaching/detaching between a driving side and a driven side, and a spring 69 is interposed between the hub 66 on the robot arm 6 side and the slider 68 for mitigating impact in the axis direction upon coupling.

Next, a motion example of the driving mechanism 5 of the nursing bed 1 according to this embodiment will be described.

The robot arm 6 is driven, thereby bringing and positioning the rotational driver 52 on the distal end of the arm close to a desired driving force input port 7 so as to face the same. The air cylinder 63 on the distal end of the robot arm 6 is driven, thereby advancing the rotational driver 52 toward the driving force input port 7 along the third axis L3 so that the both are engaged with each other. At this time, a stroke length of the air cylinder 63 is detected so as to confirm that the rotational driver 52 and the driving force input port 7 are normally engaged with each other.

Next, the driving motor 57 on the distal end of the robot arm 6 is driven so as to rotate the rotational driver 52. Since the rotational driver 52 is connected to the driving force input port 7, the rotational force from the rotational driver 52 is transmitted to the driving force input port 7. As a result, a part of the bed portion 3 corresponding to this driving force input port 7 performs a predetermined motion.

After rotating the driving force input port 7 by a predetermined amount, the driving motor 57 is stopped. The air cylinder 63 is driven so as to bring back the rotational driver 52, thereby separating the rotational driver 52 from the driving force input port 7. The robot arm 6 is driven so as to move and position the rotational driver 52 to the next driving force input port 7.

Next, a motion example of the nursing bed according to this embodiment, namely a shape change method will be described.

The rotational driver 52 on the distal end of the robot arm 6 is connected to the first driving force input port 7A (corresponding to the right knee) and the driving motor 57 is rotated. Thereby, the rotational driving force from the rotational driver 52 is transmitted to a driving system of a part corresponding to the right knee of the bed portion 3 of the nursing bed 1. As a result, the part corresponding to the right knee is deformed into a mountain shape.

After stopping the rotation of the driving motor 57, the air cylinder 63 is driven so as to separate the power connection portions (the rotational driver 52 and the driving force input port 7), and the robot arm 6 is driven so as to connect the rotational driver 52 on the distal end of the robot arm 6 to the second driving force input port 7B (corresponding to vertical motions of the waist region).

In this state, the driving motor 57 is rotated. Thereby, the rotational driving force from the rotational driver 52 is transmitted to a vertical driving system of the mobile bodies 13B corresponding to the waist region 10 of the bed portion 3 of the nursing bed 1. As a result, the mobile bodies 13B corresponding to the waist region 10 are elevated.

After stopping the rotation of the driving motor 57, the air cylinder 63 is driven so as to separate the power connection portions, and the robot arm 6 is driven so as to connect the rotational driver 52 on the distal end of the robot arm 6 to the third driving force input port 7C (corresponding to horizontal motions of the waist region).

In this state, the driving motor 57 is rotated. Thereby, the rotational driving force from the rotational driver 52 is transmitted to a horizontal driving system of the mobile bodies 13B corresponding to the waist region 10 of the bed portion 3 of the nursing bed 1. As a result, the mobile bodies 13B corresponding to the waist region 10 are moved horizontally.

After stopping the rotation of the driving motor 57, the air cylinder 63 is driven so as to separate the power connection portions, and the robot arm 6 is driven so as to connect the rotational driver 52 on the distal end of the robot arm 6 to the fourth driving force input port 7D (corresponding to vertical motions of the shoulder region).

In this state, the driving motor 57 is rotated. Thereby, the rotational driving force from the rotational driver 52 is transmitted to a vertical driving system of the mobile bodies 13B corresponding to the shoulder region 9 of the bed portion 3 of the nursing bed 1. As a result, the mobile bodies 13B corresponding to the shoulder region 9 are elevated.

After stopping the rotation of the driving motor 57, the air cylinder 63 is driven so as to separate the power connection portions, and the robot arm 6 is driven so as to connect the rotational driver 52 on the distal end of the robot arm 6 to the fifth driving force input port 7E (corresponding to horizontal motions of the shoulder region).

In this state, the driving motor 57 is rotated. Thereby, the rotational driving force from the rotational driver 52 is transmitted to a horizontal driving system of the mobile bodies 13B corresponding to the shoulder region 9 of the bed portion 3 of the nursing bed 1. As a result, the mobile bodies 13B corresponding to the shoulder region 9 are moved horizontally.

After stopping the rotation of the driving motor 57, the air cylinder 63 is driven so as to separate the power connection portions, and the robot arm 6 is driven so as to connect the rotational driver 52 on the distal end of the robot arm 6 to the third driving force input port 7C (corresponding to horizontal motions of the waist region).

In this state, the driving motor 57 is rotated. Thereby, the rotational driving force from the rotational driver 52 is transmitted to the horizontal driving system of the mobile bodies 13B corresponding to the waist region 10 of the bed portion 3 of the nursing bed 1. As a result, the mobile bodies 13B corresponding to the waist region 10 are further moved horizontally.

After stopping the rotation of the driving motor 57, the air cylinder 63 is driven so as to separate the power connection portions, and the robot arm 6 is driven so as to connect the rotational driver 52 on the distal end of the robot arm 6 to the fifth driving force input port 7E (corresponding to horizontal motions of the shoulder region).

In this state, the driving motor 57 is rotated. Thereby, the rotational driving force from the rotational driver 52 is transmitted to the horizontal driving system of the mobile bodies 13B corresponding to the shoulder region 9 of the bed portion 3 of the nursing bed 1. As a result, the mobile bodies 13B corresponding to the shoulder region 9 are further moved horizontally.

A robot is taught as mentioned above so as to program a bedsore prevention motion suitable for a care receiver P. The above-mentioned motion example is of the case when the trunk in the shoulder portion and the waist portion is shifted to the left. Further, for shifting the trunk to the right hereafter, the above-mentioned procedure is performed inversely where the trunk is once returned straight, and further the driving force input port corresponding to the left knee is selected so as to change the posture.

Note that, the upward and downward directions of the vertical motion and the right and left directions of the horizontal motion are switched by a forward/reverse rotation of the driving motor 57.

Figure 21:
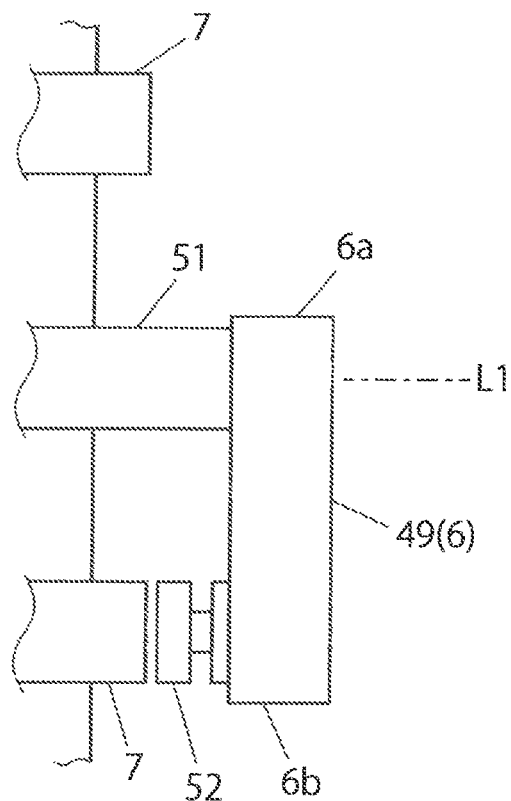
FIG. 21 is a side view illustrating a variation of the driving force input port and the robot arm of the driving mechanism of the nursing bed in FIG. 1.
Figure 22:
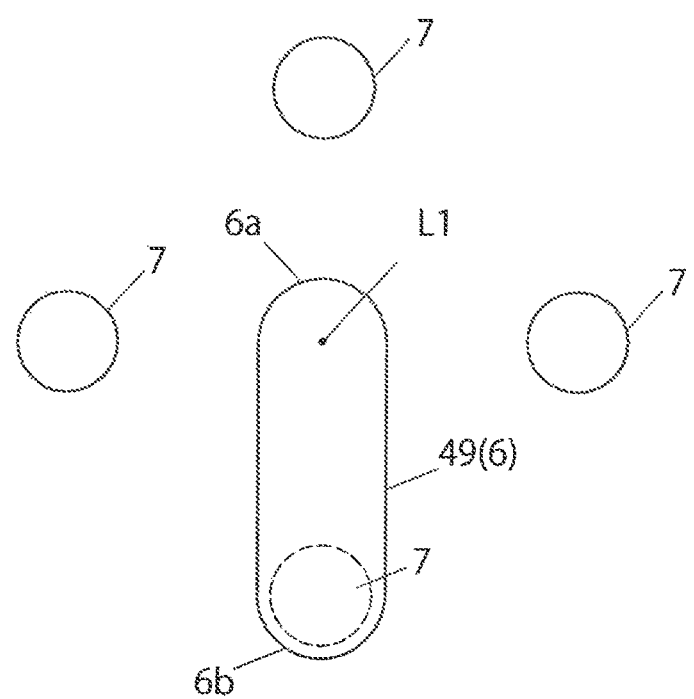
FIG. 22 is a front view of the driving force input port and the robot arm in FIG. 21.

As a variation of the embodiment above, the robot arm 6 may be configured by a single link member including a proximal end portion 6a and a distal end portion 6b. Namely, as illustrated in FIG. 21 and FIG. 22, a base end portion of a single link member 49 is mounted to the upper end portion of the robot main shaft 51 and the rotational driver 52 is provided to the distal end portion of said link member 49.

Additionally, the plurality of driving force input ports 7 are arranged on a virtual circle about the rotational axis (the first axis L1) of the robot main shaft 51. In this configuration, the robot arm 6 is turned by the rotation of the robot main shaft 51 so that the rotational driver 52 on the distal end portion of the robot arm 6 can be positioned in front of a desired driving force input port 7.

Note that, in this variation, the connection mechanism of the rotational driver 52 and the driving force input port 7 is the same as that of the embodiment above.

Figure 23:
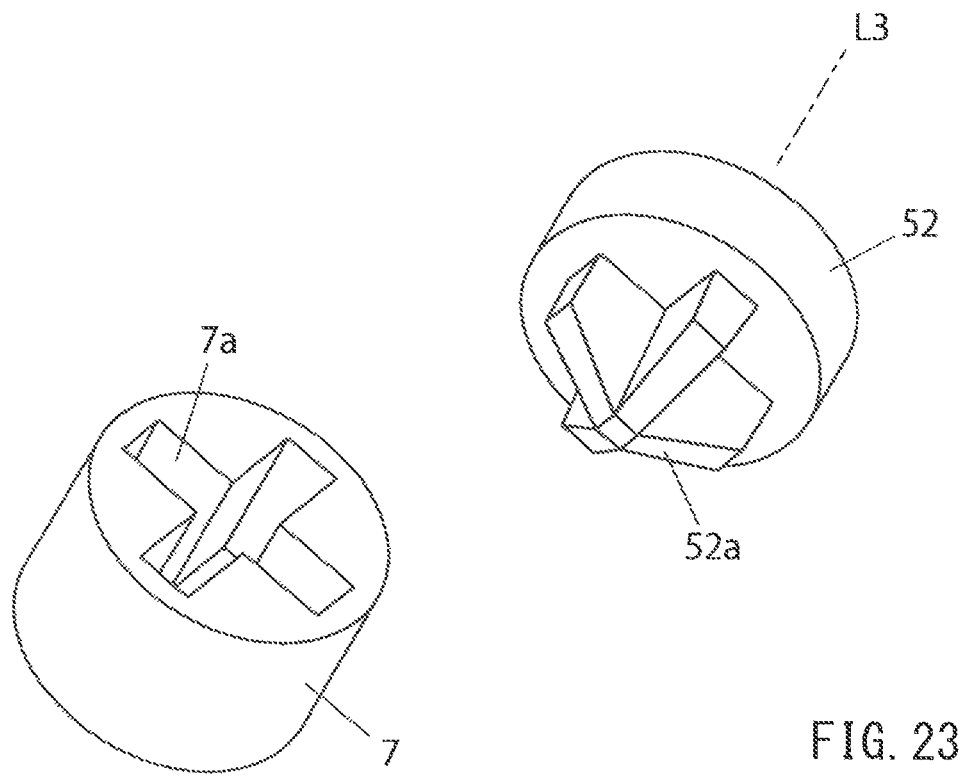
FIG. 23 is a perspective view illustrating a variation of the power connection portion of the driving mechanism of the nursing bed in FIG. 1.

As another variation of the embodiment above, as illustrated in FIG. 23, a cross-shaped connecting recessed portion 7a is formed in the driving force input port 7, and also a cross-shaped connecting protruding portion 52a is formed in the rotational driver 52. The connecting recessed portion 7a and the connecting protruding portion 52a respectively have a dimension and a shape to be gently fitted to each other.

Additionally, as illustrated in FIG. 23, the connecting protruding portion 52a has a tapered shape, while the connecting recessed portion 7a has an inclined shape corresponding to the tapered shape of the connecting protruding portion 52a.

In this connecting method, the connecting protruding portion 52a of the rotational driver 52 is fitted to the connecting recessed portion 7a formed in the driving force input port 7 from the front. At this time, by the tapered shape of the connecting protruding portion 52a and the inclined shape of the connecting recessed portion 7a being engaged with each other, a positioning function is exerted in a direction that a positioning error of the rotational driver 52 to the driving force input port 7 or the like is absorbed, thereby achieving a natural engagement.

In another variation of the embodiment above, concerning a connecting method of the rotational driver 52 and the driving force input port 7, the connection may be configured so that the both are brought close to each other and connected along a direction orthogonal to the rotational axis (the third axis L3).

Figure 24:
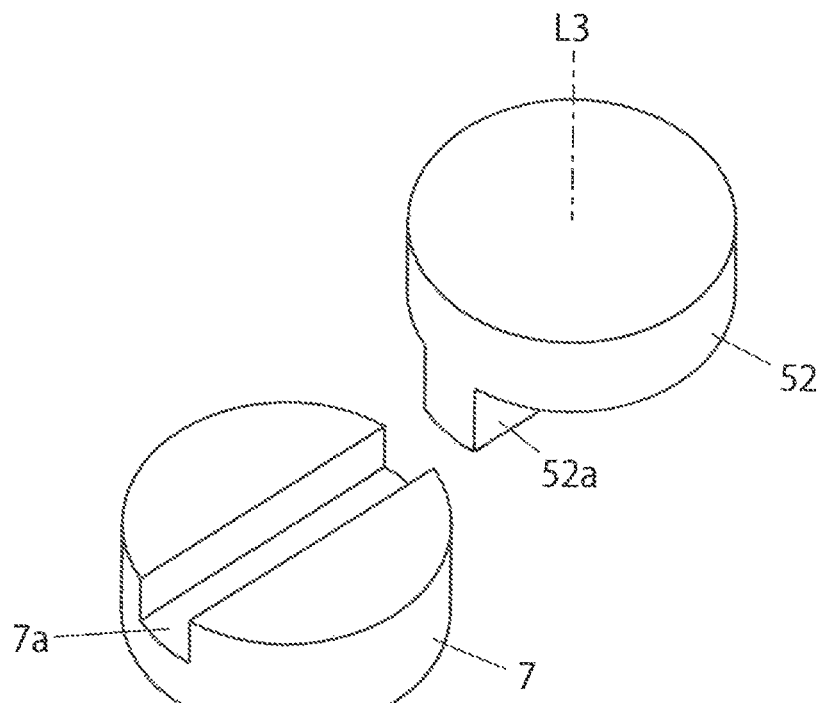
FIG. 24 is a perspective view illustrating a variation of the power connection portion of the driving mechanism of the nursing bed in FIG. 1.

Specifically, as illustrated in FIG. 24, the connecting recessed portion 7a is formed in the driving force input port 7 along its diameter direction, and also the connecting protruding portion 52a is formed in the rotational driver 52 along its diameter direction. The connecting recessed portion 7a and the connecting protruding portion 52a respectively have a dimension and a shape to be gently fitted to each other.

In this connecting method, as illustrated in FIG. 24, the connecting protruding portion 52a of the rotational driver 52 can be fitted to the connecting recessed portion 7a formed in the driving force input port 7 from its side. Therefore, in connection to the driving force input port 7, the rotational driver 52 does not need to be advanced in the rotational axis (the third axis L3) direction, and therefore the air cylinder 63 or the like can be omitted so that the structure is simplified.

As another variation of the embodiment above, a plurality of driving force input ports 7 of two nursing beds 1 may be selectively driven by the rotational driver 52 of the common robot arm 6.

Figure 25:
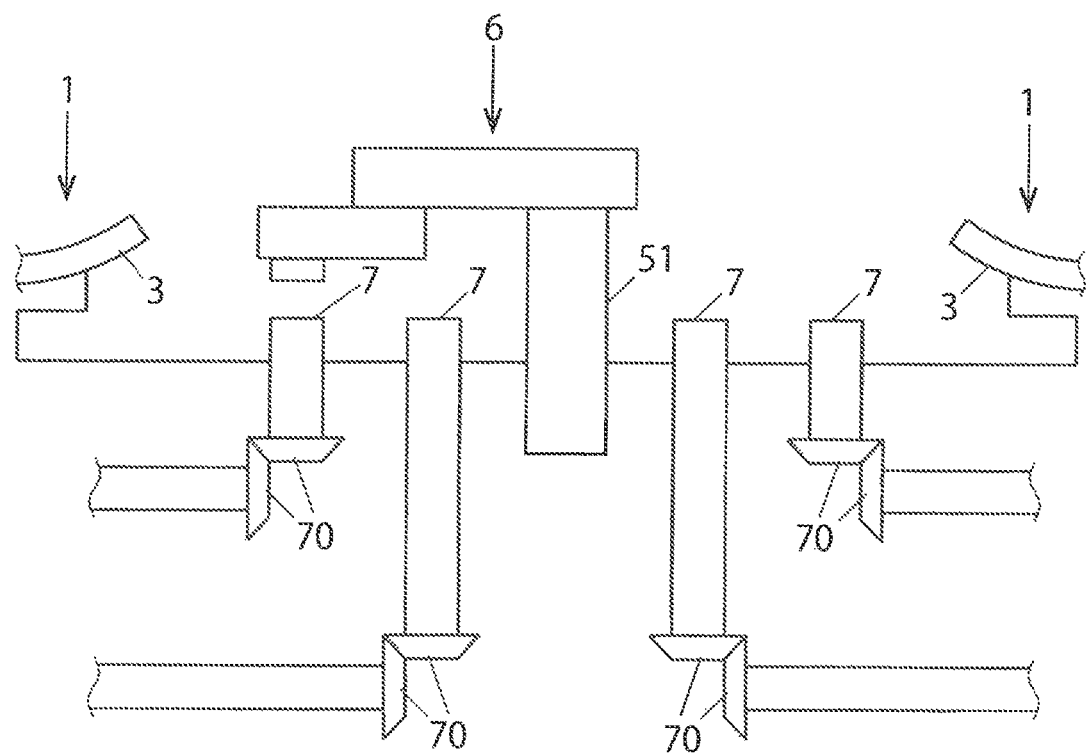
FIG. 25 is a sectional view illustrating a structure that each driving force input port of two nursing beds is driven by one robot, as a variation of the driving mechanism of the nursing bed in FIG. 1.

Namely, in this variation, as illustrated in FIG. 25, two each of bed portion 3 of the nursing bed 1 and its driving mechanism (except for the robot arm part) are arranged. The robot main shaft 51 is arranged in the vertical direction, and each driving force input port 7 is also arranged in the vertical direction via the bevel gear 70.

Additionally, in the variation, by rotationally driving the robot arm 6 in the horizontal direction so as to position the same to a desired driving force input port 7, a plurality of driving force input ports 7 of one nursing bed 1 and a plurality of driving force input ports 7 of the other nursing bed 1 can be rotationally driven selectively by the rotational driver 52 of the common robot arm 6.

In another variation of the embodiment above, as a mechanism for advancing/retreating the rotational driver 52 on the distal end of the robot arm 6, a mechanism for moving the robot main shaft 51 along its rotational axis may be provided instead of the mechanism that the air cylinder is provided to the arm distal end, so as to move the whole robot arm 6 by advance/retreat motion of the robot main shaft 51.

As another variation of the embodiment above, a connecting mechanism of the rotational driver 52 and the driving force input port 7 may be configured so that the air cylinder or the like is provided on the driving force input port 7 side so as to drive the driving force input port 7 forward and backward to the rotational driver 52, instead of the method that the rotational driver 52 is driven forward and backward to the driving force input port 7.

As another variation of the embodiment above, concerning a connecting method of the power connection portions (driving force input port 7 and rotational driver 52), a friction plate may be provided to the rotational driver 52 on the distal end of the robot arm 6 and also a friction plate may be provided to the driving force input port 7 as well, instead of the method that the recessed portion and the protruding portion are fitted to each other as mentioned above.

In this variation, by rotating the rotational driver 52 while pressing the same against the driving force input port 7, the both friction plates are engaged with each other so as to achieve a connected state. Thereby, sliding is generated between the friction plates upon connection, and therefore power is transmitted smoothly. Thereby, motion of the bed portion 3 also becomes smooth, reducing a burden on the care receiver P further.

Additionally, as another connecting method of the power connection portions (driving force input port 7 and rotational driver 52), a method to connect the rotational driver 52 and the driving force input port 7 by magnetic force may be employed.

Next, various variations of the above-mentioned driving mechanism 5 of the nursing bed 1 will be described.

In the embodiment above, the driving motor 57 is installed on the distal end of the robot arm 6 so as to supply its rotational driving force to each driving force input port 7. Instead of this configuration, a plurality of driving motors may be installed on the bed base 4 side for each part of the bed portion 3 and a clutch switching when transmitting the driving force to each part may be operated by the robot arm 6. In this case, a switch for operating the clutch is installed on the bed base 4 side instead of the driving force input port 7.

Additionally, a single driving motor may be installed on the bed base 4 side and the clutch switching when distributing/transmitting its driving force to each part may be operated by the robot arm 6. In that case, a switch for operating the clutch is installed on the bed base 4 side instead of the driving force input port 7.

Additionally, the driving method may be air driving (such as air bag, air cylinder) instead, of the motor rotation, regardless of whether the driving source, is on either the robot side or the bed base 4 side, or regardless of either a single or a plurality of driving source/sources is/are installed.

Additionally, the robot as a switching mechanism of driving force may be mounted on a mobile carriage without installing the same on the bed base 4 side.

Additionally, the switching mechanism of driving force may be configured so as to switch by a sequencer, for example without using the robot.

Figure 26:
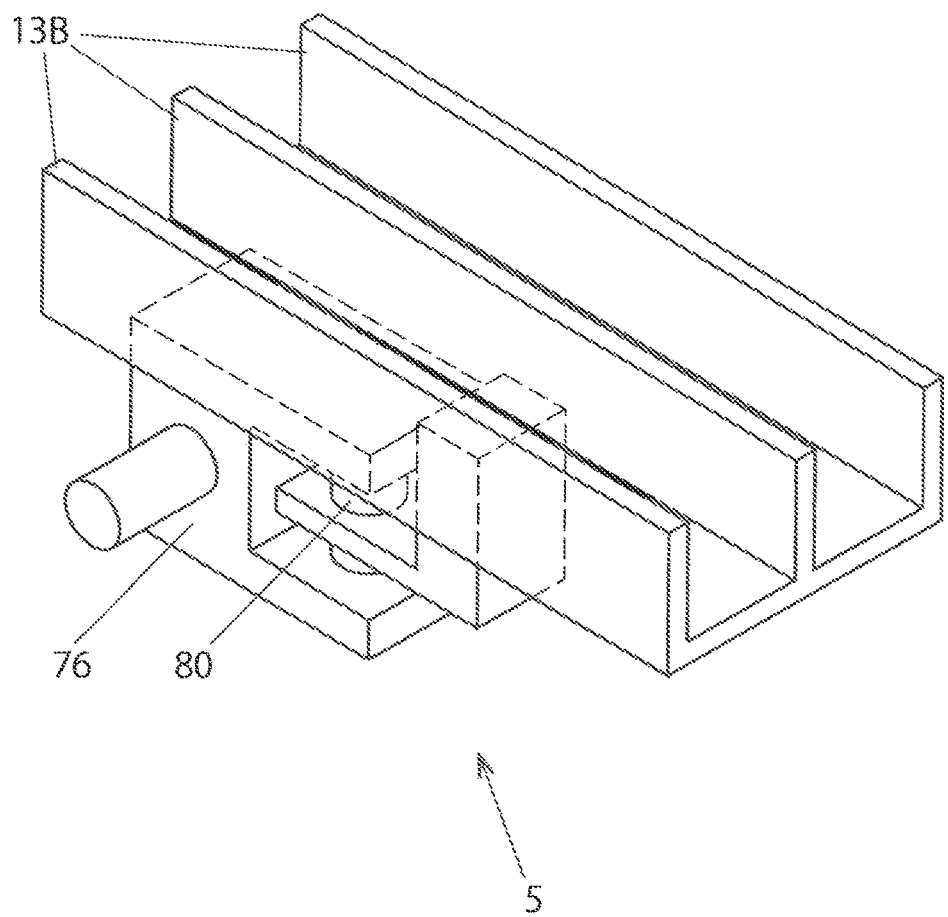
FIG. 26 is a perspective view schematically illustrating a variation of the driving mechanism of the nursing bed in FIG. 1.

As another variation of the driving mechanism 5 above, the mobile bodies (movable members) 13B may be driven to move also in the longitudinal direction in addition to the vertical direction and the lateral direction, and the mobile bodies 13B are made to move rotationally in each of the lateral direction and the longitudinal direction. FIG. 26 to FIG. 29 illustrate the driving mechanism 5 which enables driving of the mobile bodies 13B in three directions of vertical, lateral, and longitudinal directions. This driving mechanism 5 drives the integrally-formed three mobile bodies 13B simultaneously, as illustrated in FIG. 26.

Figure 27:
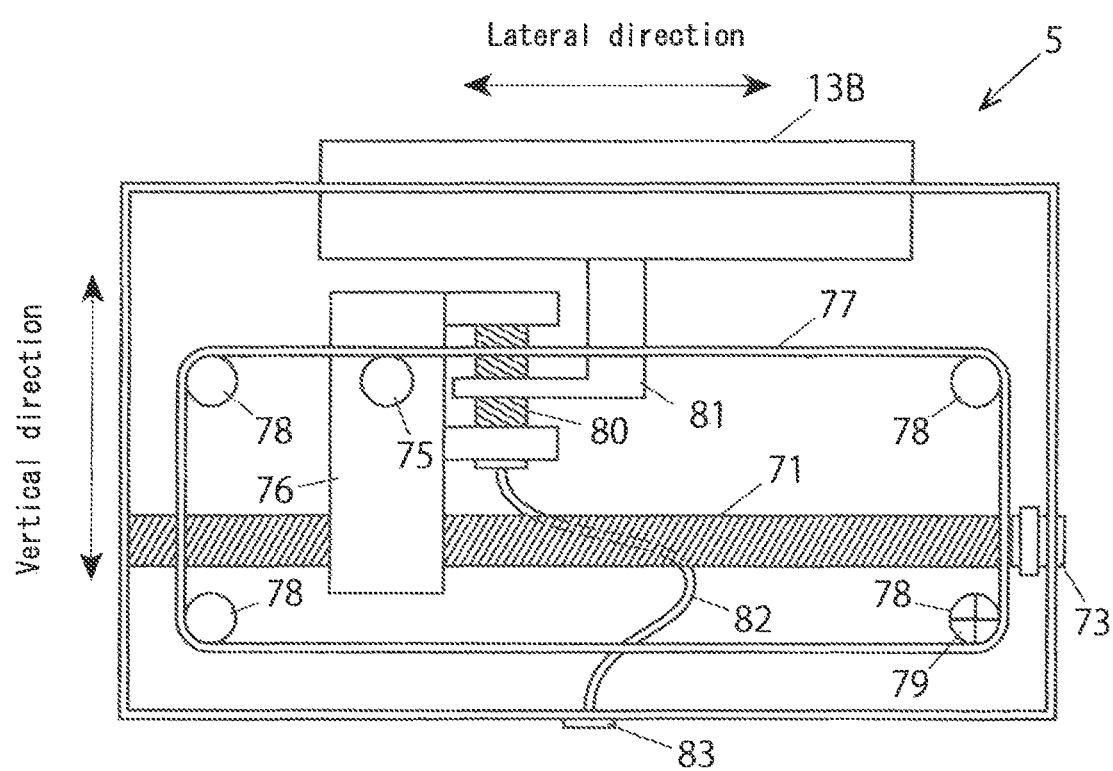
FIG. 27 is a front view schematically illustrating a variation of the driving mechanism of the nursing bed in FIG. 1.
Figure 28:
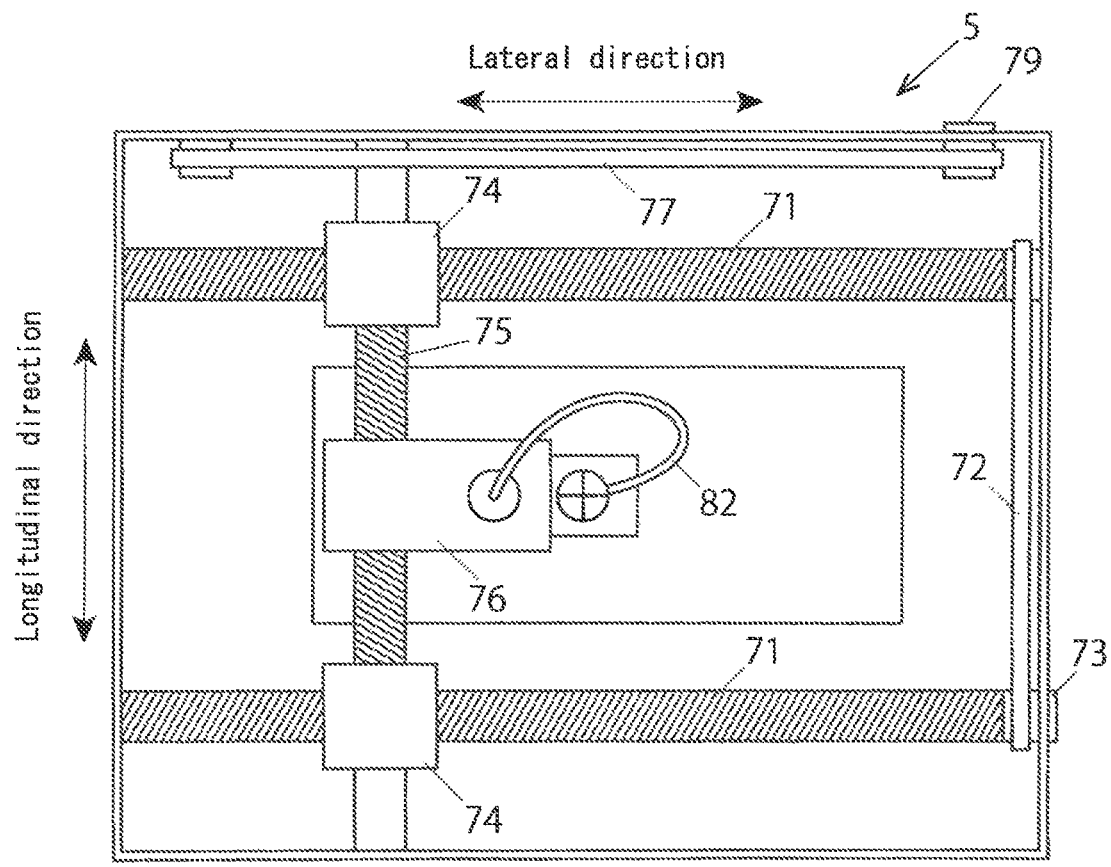
FIG. 28 is a side view schematically illustrating a variation of the driving mechanism of the nursing bed in FIG. 1.
Figure 29:
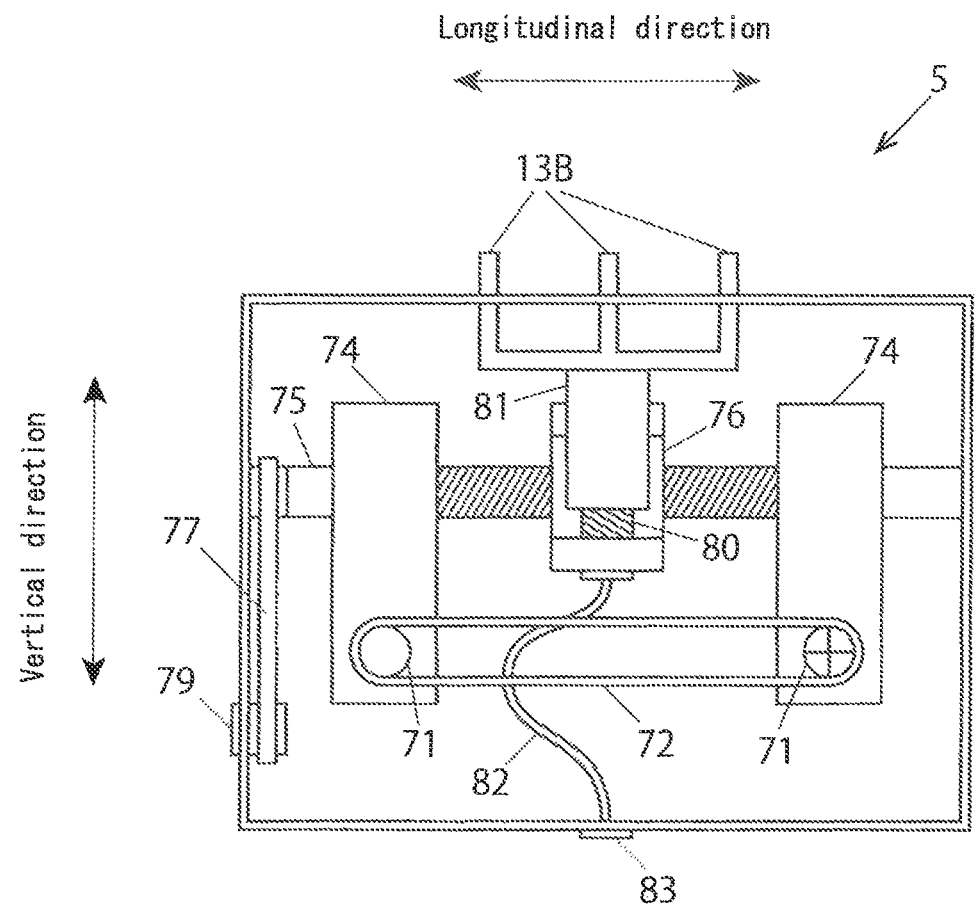
FIG. 29 is a bottom view schematically illustrating a variation of the driving mechanism of the nursing bed in FIG. 1.

The driving mechanism 5 illustrated in FIG. 27 to FIG. 29 has a pair of first ball screws 71 extending in the lateral direction, and the pair of ball screws 71 are configured to be rotationally moved simultaneously via a first toothed belt 72. One of the pair of first ball screws 71 forms a first inner port 73 at its one end, and the first inner port 73 is connected to one of the driving force input ports 7 via a flexible wire (not illustrated).

A pair of first nut members 74 are screwed and fastened to the pair of first ball screws 71, and the pair of first nut members 74 are moved in the lateral direction along a guide rail (not illustrated) by a rotation of the pair of first ball screws 71.

A second ball screw 75 extending in the longitudinal direction is rotatably inserted through the pair of first nut members 74. The center part of the second ball screw 75 is threaded, and a second nut member 76 is screwed and fastened to this threaded part.

A second toothed belt 77 is engaged with the second ball screw 75, and the second toothed belt 77 is travelably supported by four rotational members 78. In order to ensure the engaging state of the second toothed belt 77 and the second ball screw 75, the second toothed belt 77 may be pressed from above by a roller or the like, for example.

One of the four rotational members 78 supporting the second toothed belt 77 forms a second inner port 79, and the second inner port 79 is connected to one of the driving force input ports 7 via a flexible wire (not illustrated). By making the second toothed belt 77 travel, the second ball screw 75 is rotated, and accordingly the second nut member 76 is moved in the longitudinal direction along a guide rail (not illustrated).

A third ball screw 80 extending in the vertical direction is rotatably supported to the second nut member 76, and the third ball screw 80 is screwed to a third nut member 81 connected, to the mobile body 13B. A lower end portion of the third ball screw 80 is connected to the third inner port 83 via a flexible wire 82. The third inner port 83 is connected to one of the driving force input ports 7 via a flexible wire (not illustrated). By rotating the third ball screw 80, the third nut member 81 guided by a guide rail (not illustrated) can be driven to be elevated/lowered.

Figure 5:
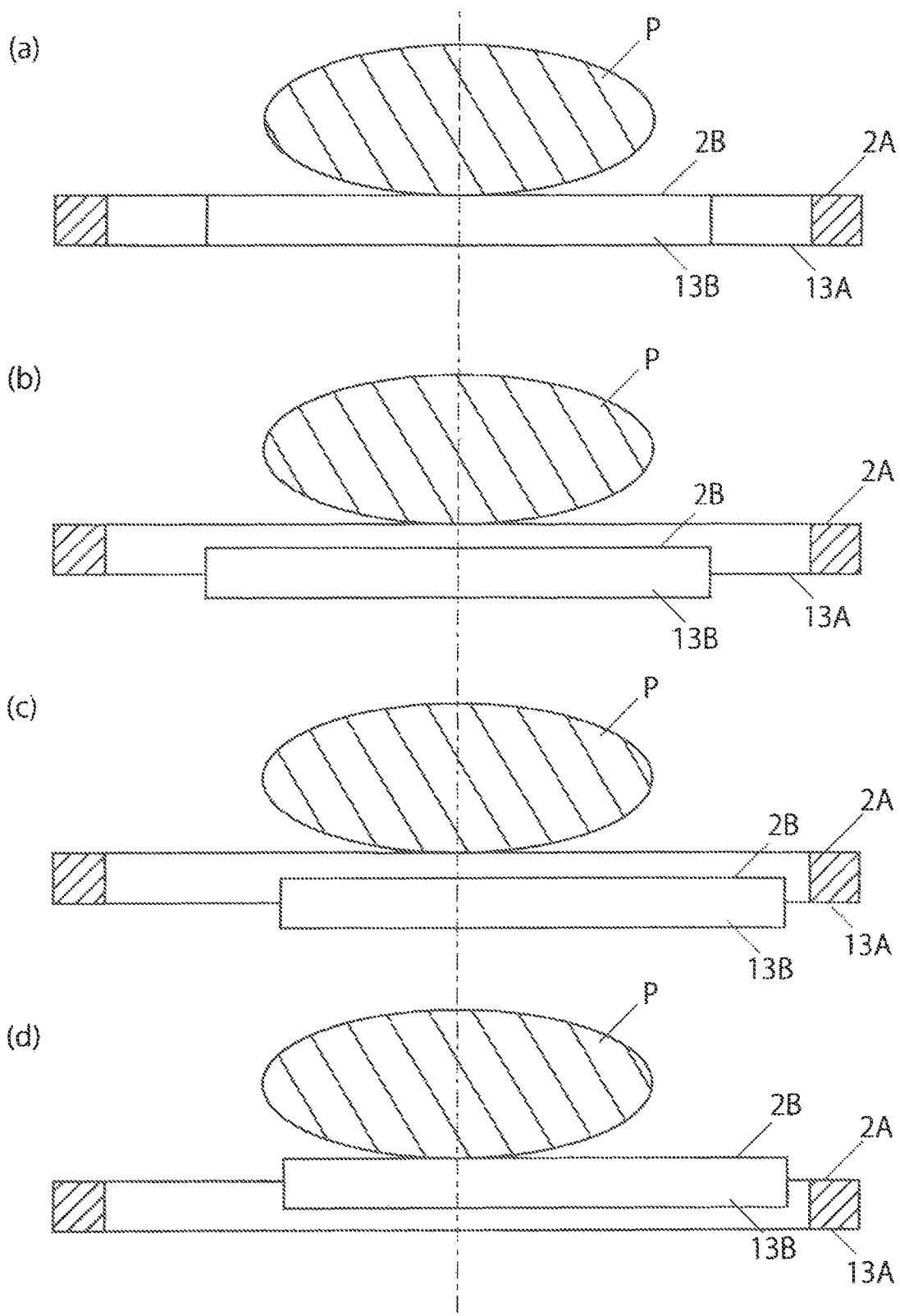
FIG. 5 is a schematic view illustrating a motion of the nursing bed in FIG. 1.
Figure 6:
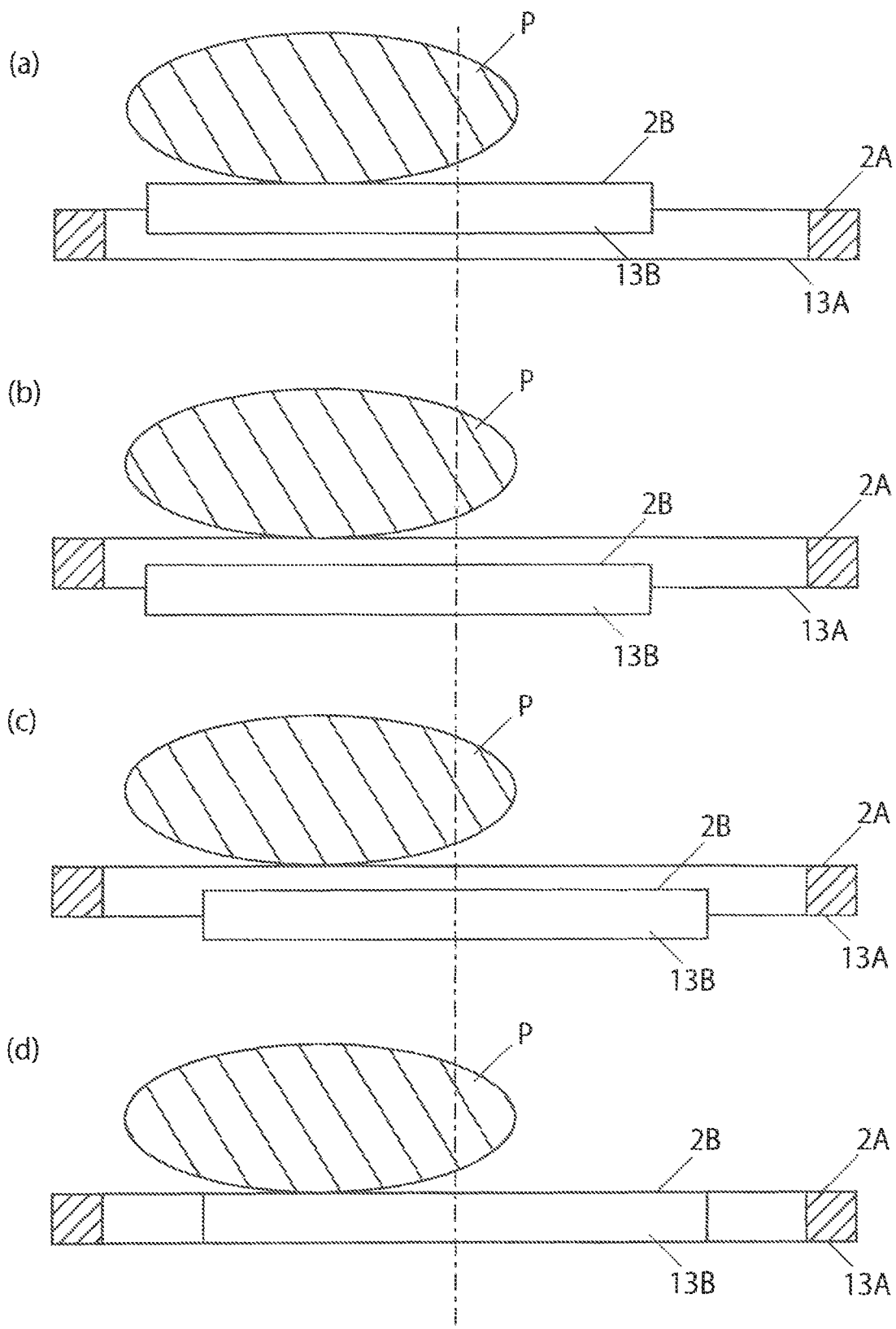
FIG. 6 is another schematic view illustrating a motion of the nursing bed in FIG. 1.

By using the driving mechanism 5 above, the mobile body 13B can perform a rotational motion about a lateral axis, namely a moving motion of a patient in the height direction, in addition to the rotational motion about a longitudinal axis, namely the moving motion of the trunk of the patient in the lateral direction (FIG. 5, FIG. 6).

Note that, the second nut member 76 is moved in the lateral direction when the first inner port 73 is rotated, but at this time, if the second toothed belt 77 is stopped, the second ball screw 75 is rotationally driven and the second nut member 76 is moved also in the longitudinal direction simultaneously. Thus, in order to move the second nut member only in the lateral direction, the second inner port 79 is rotated simultaneously so as to cancel the derived movement. Note that the robot arm 6 of the second robot is used to rotationally drive the driving force input port 7 connected to the second inner port 79.

By arranging a limit switch 84 in a predetermined position in a movable, range of the mobile body 13B as illustrated in FIG. 27, the mobile body 13B can be moved exactly to a predetermined position in each of the vertical, lateral, and longitudinal directions.

Figure 30:
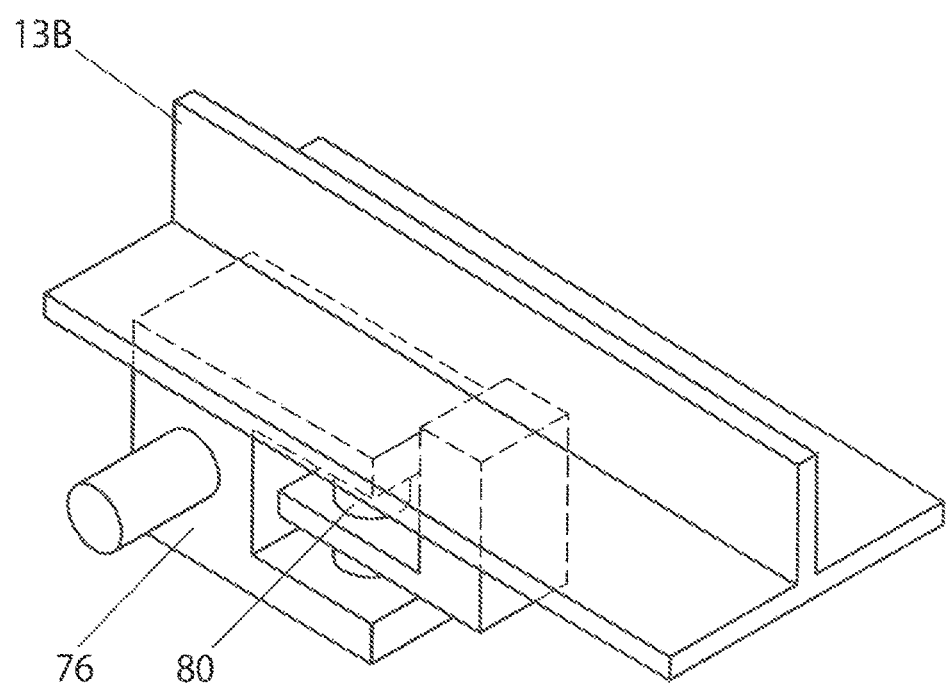
FIG. 30 is a perspective view schematically illustrating another variation of the driving mechanism of the nursing bed in FIG. 1.

The driving mechanism 5 illustrated in FIG. 30 is configured to drive each of a plurality of mobile bodies 13B separately. In this driving mechanism 5, one mobile body 13B is assigned to one third ball screw 80. Thereby, the individual mobile body 13B can be driven in the vertical, lateral, and longitudinal directions, independently.

In the nursing bed 1 according to this embodiment, the robot arm 6 is driven by a program previously installed in the robot control portion 58 so as to automatically perform a predetermined bedsore prevention motion, and therefore a caregiver does not need to work periodically in midnight or the like, relieving mental and physical burden on the caregiver and also relieving mental burden on the care receiver P to the caregiver.

Additionally, by positioning the robot arm 6, the rotational driving force is selectively transmitted to a plurality of driving force input ports 7 by the common rotational driver 52, and thereby a plurality of different motions can be realized by a single drive source, simplifying the configuration.

Additionally, by changing teaching contents for the robot, a specifying order (sequence) of a supply point of driving force (driving force input port 7) can be easily changed. Therefore, flexibility for realizing a plurality of different motions can be enhanced.

Additionally, since the robot arm 6 itself functions to switch power transmission to a plurality of driving force input ports 7, a conventional clutch mechanism for switching the destination of power transmission can be eliminated.

Additionally, since the mobile body (movable member) 13B performs rotational motion in a range where the fixed member 13A exists in every direction of the vertical, lateral, and longitudinal directions, the mobile body 13B can be moved in the longitudinal direction in addition to the lateral direction of the bed, and also the mobile body 13B does not protrude in that direction and delicate motions become possible. For example, when the upper body is moved to the fore side and the lower body is moved to the rear side, a motion for stretching the upper and lower bodies become possible.

Next, a nursing bed according to another embodiment of the present invention will be described referring to FIG. 31 to FIG. 35.

Figure 31:
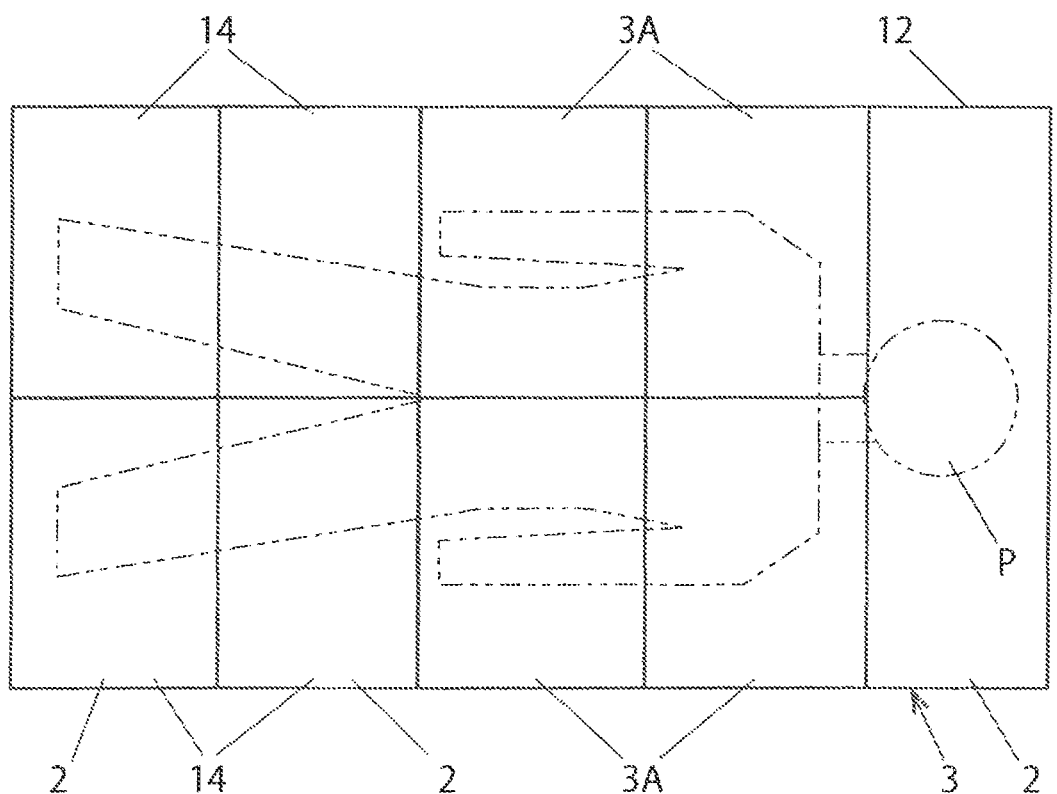
FIG. 31 is a plan view schematically illustrating a nursing bed according to another embodiment of the present invention.
Figure 32:
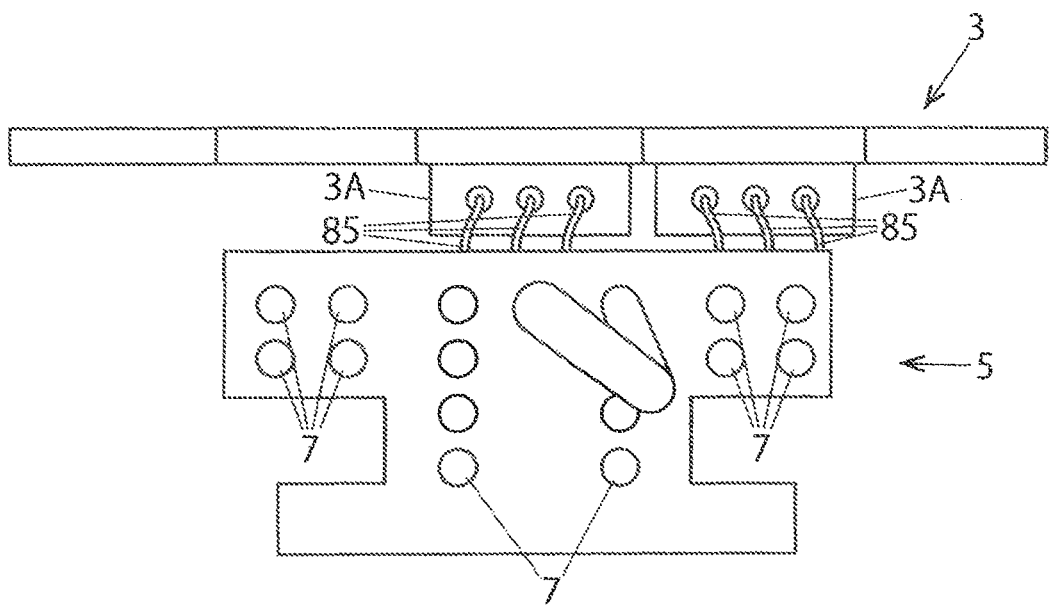
FIG. 32 is a side view schematically illustrating the nursing bed in FIG. 31.
Figure 33:
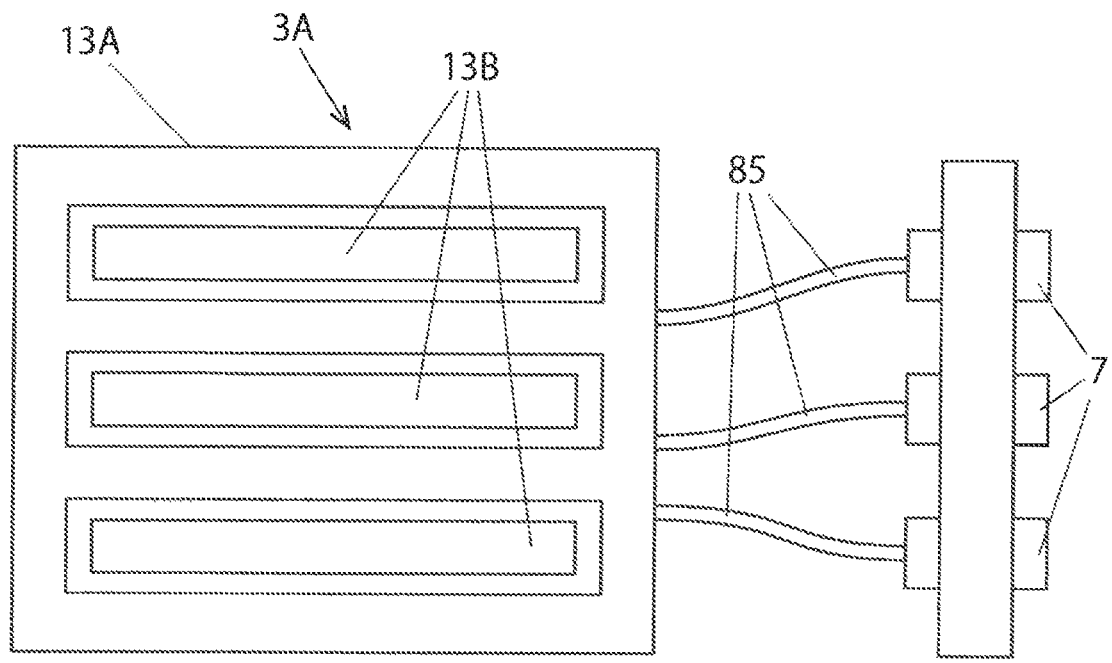
FIG. 33 is a schematic view illustrating an upper surface of a bed portion unit of the nursing bed in FIG. 31 together with the driving force input port.
Figure 34:
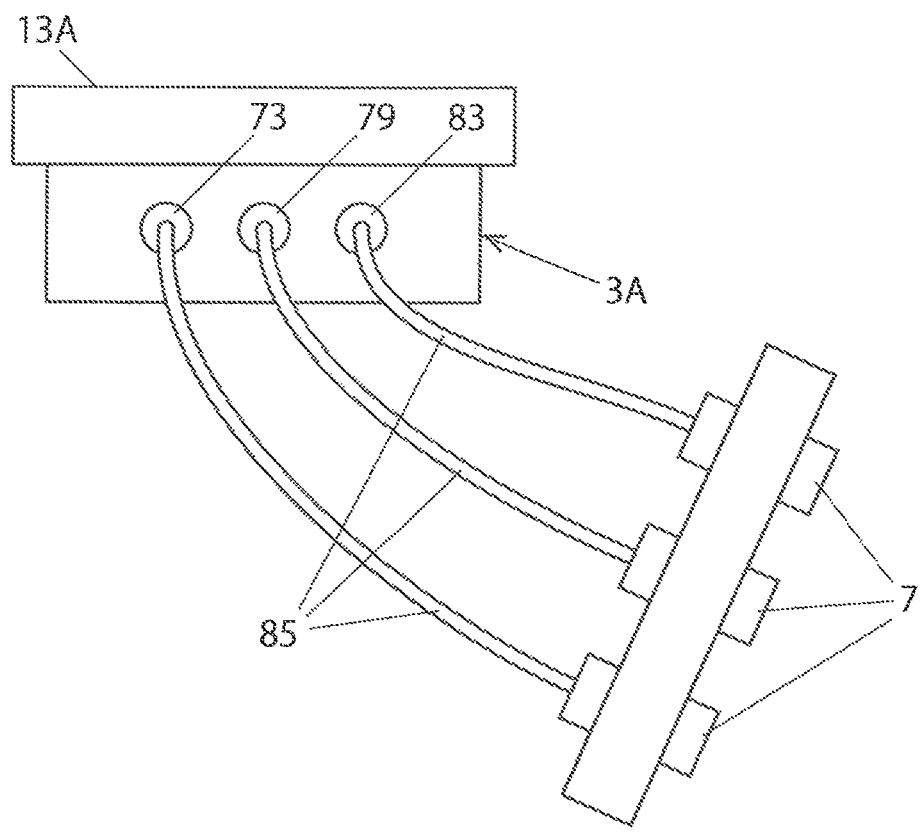
FIG. 34 is a schematic view illustrating a side surface of the bed portion unit in FIG. 33 together with the driving force input port.

In the nursing bed according to this embodiment, the bed portion 3 comprises a plurality of bed portion units 3A, as illustrated in FIG. 31 and FIG. 32. The driving mechanism 5 illustrated in FIG. 27 to FIG. 29 is stored inside each bed portion unit 3A. Each bed portion unit 3A has a slit-shaped fixed member 13A and a plurality of slender mobile bodies (movable members) 13B, as illustrated in FIG. 33. The driving force input ports 7 and the inner ports 73, 79, and 83 are connected by flexible wires 85, and power is supplied to the driving mechanism 5 in the bed portion unit 3A via the flexible wires 85.

Figure 35:
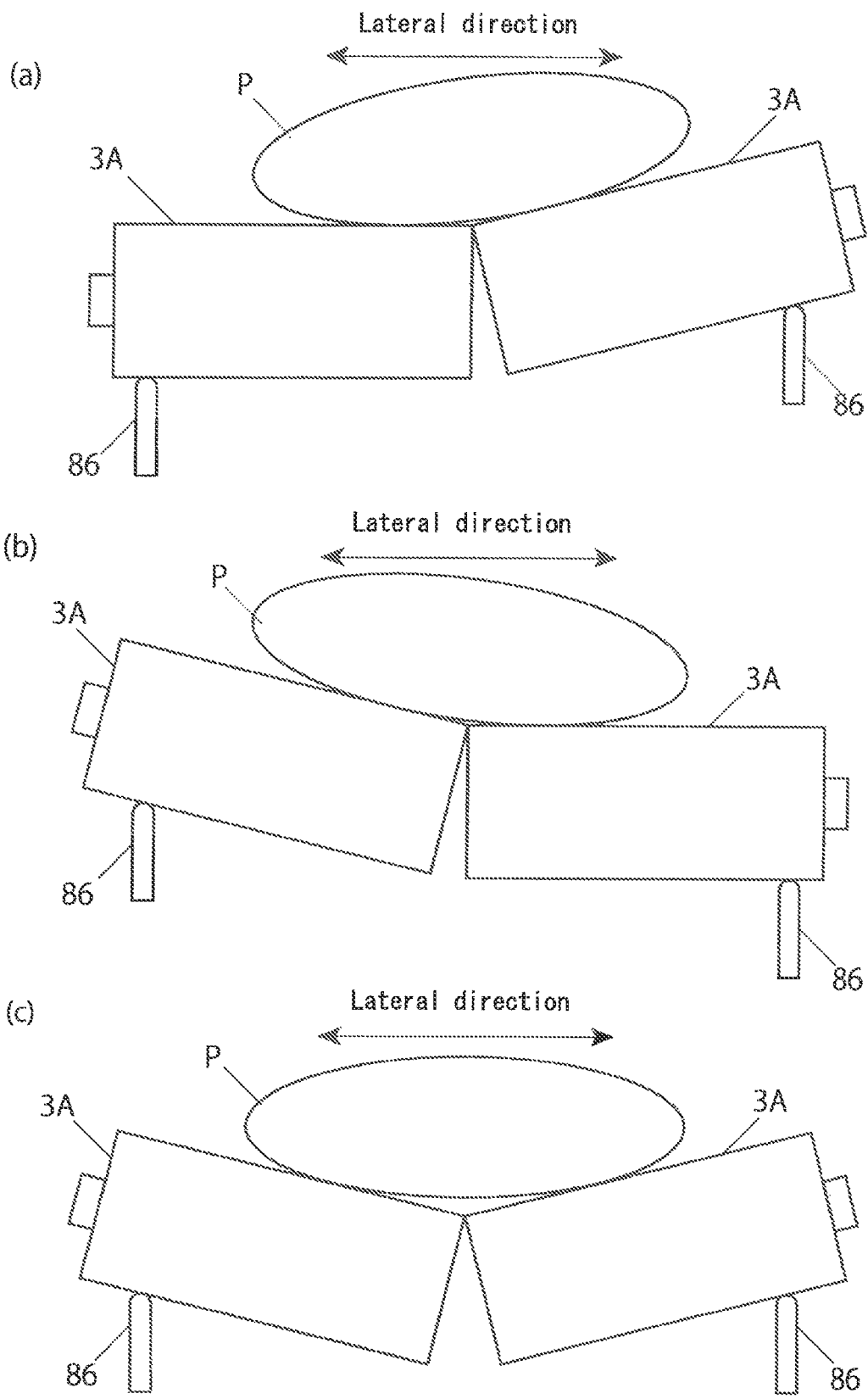
FIG. 35 is a schematic view illustrating a motion of the nursing bed in FIG. 31.

As illustrated in FIG. 35 (*a*), (*b*), (*c*), a plurality of bed portion units 3A are driven to be inclined independently to each other by bed portion unit driving unit 86. The bed portion unit driving unit 86 are connected to the driving force input ports 7 via flexible wires (not illustrated), and power is supplied therefrom. As the bed portion unit driving unit 86, the elevating/lowering driving mechanism illustrated in FIG. 13, for example may be employed.

In this embodiment, the mobile bodies 13B can be driven in different motions for each bed portion unit 3A. Alternatively, a plurality of mobile bodies 13B belonging to the same bed portion unit 3A may be integrally formed and driven simultaneously or they may be formed separately and driven individually. Alternatively, a plurality of mobile bodies 13B belonging to the same bed portion unit 3A may be divided into several groups and the plurality of mobile bodies 13B belonging to each group may be driven simultaneously.

Also in this embodiment, the driving mechanism 5 can make the mobile body 13B perform the rotational motion illustrated in FIG. 5 and FIG. 6.

Figure 36:
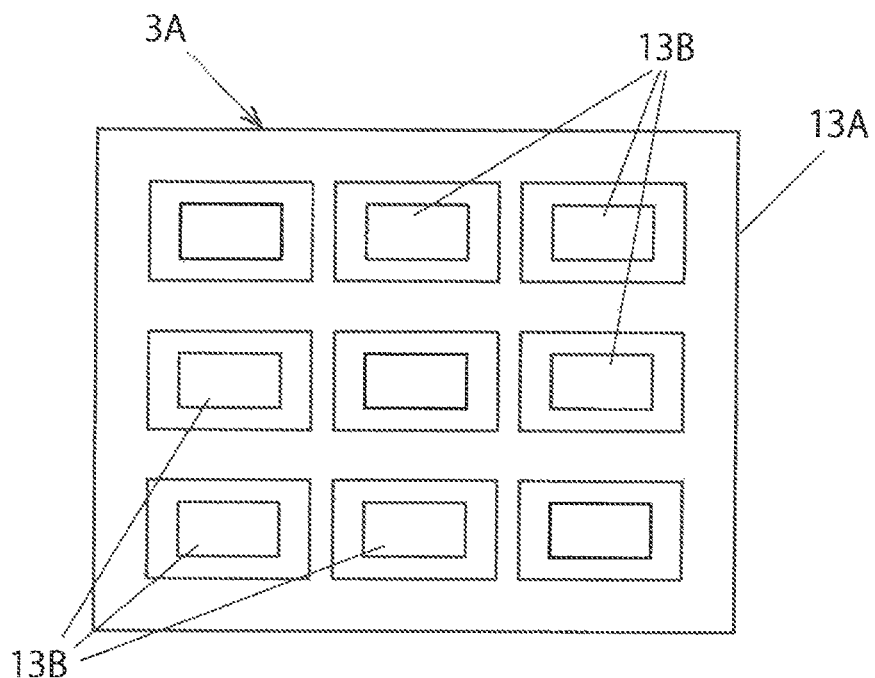
FIG. 36 is a plan view schematically illustrating a variation of the bed portion unit of the nursing bed in FIG. 31.
Figure 37:
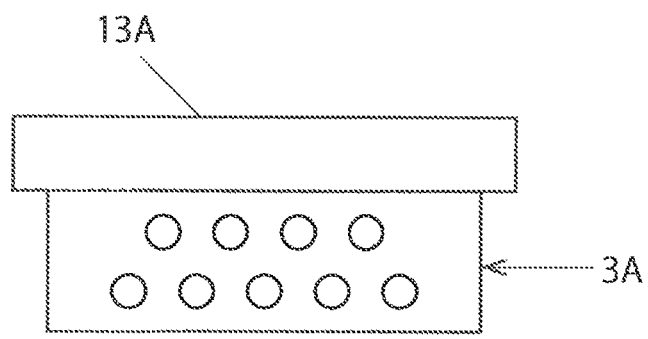
FIG. 37 is a side view schematically illustrating the bed portion unit in FIG. 36.

As a variation of this embodiment, each bed portion unit 3A may be configured by a lattice-shaped fixed member 13A and a plurality of mobile bodies (movable members) 13B, as illustrated in FIG. 36 and FIG. 37. Also in this variation, the mobile bodies 13B can be driven in different motions for each bed portion unit 3A. Alternatively, a plurality of mobile bodies 13B belonging to the same bed portion unit 3A may be integrally formed and driven simultaneously or they may be formed separately and driven individually. Alternatively, a plurality of mobile bodies 13B belonging to the same bed portion unit 3A may be divided into several groups and the plurality of mobile bodies 13B belonging to each group may be driven simultaneously.

Figure 38:
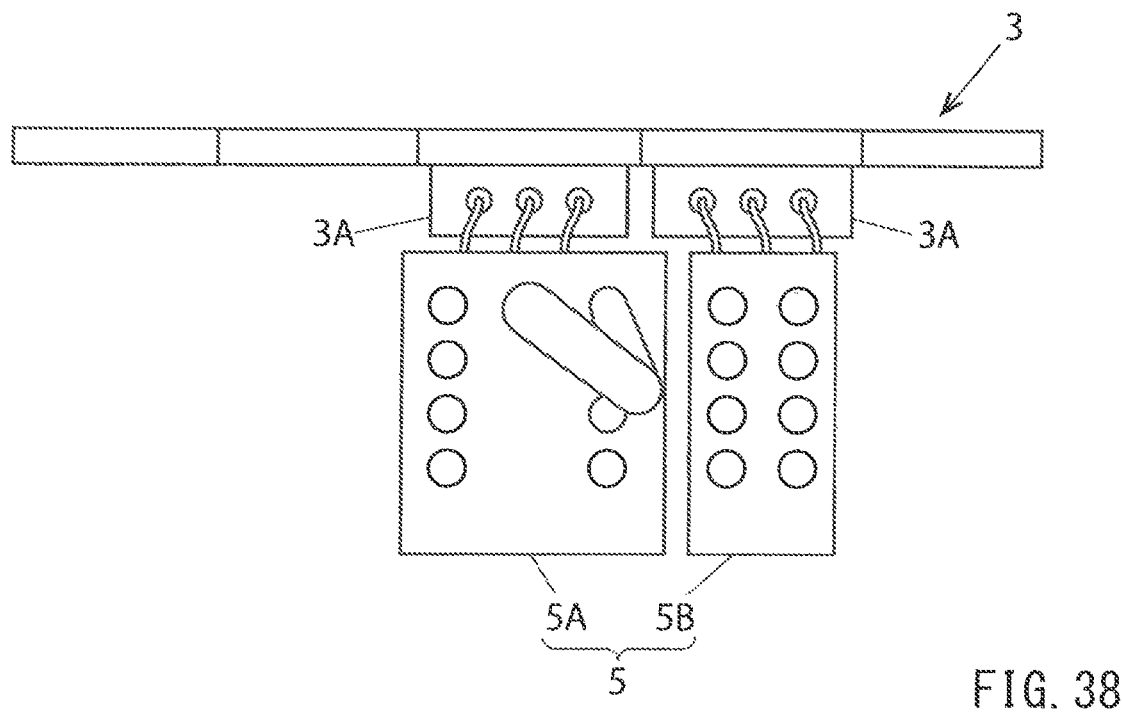
FIG. 38 is a side view schematically illustrating another embodiment of the nursing bed in FIG. 1.
Figure 39:
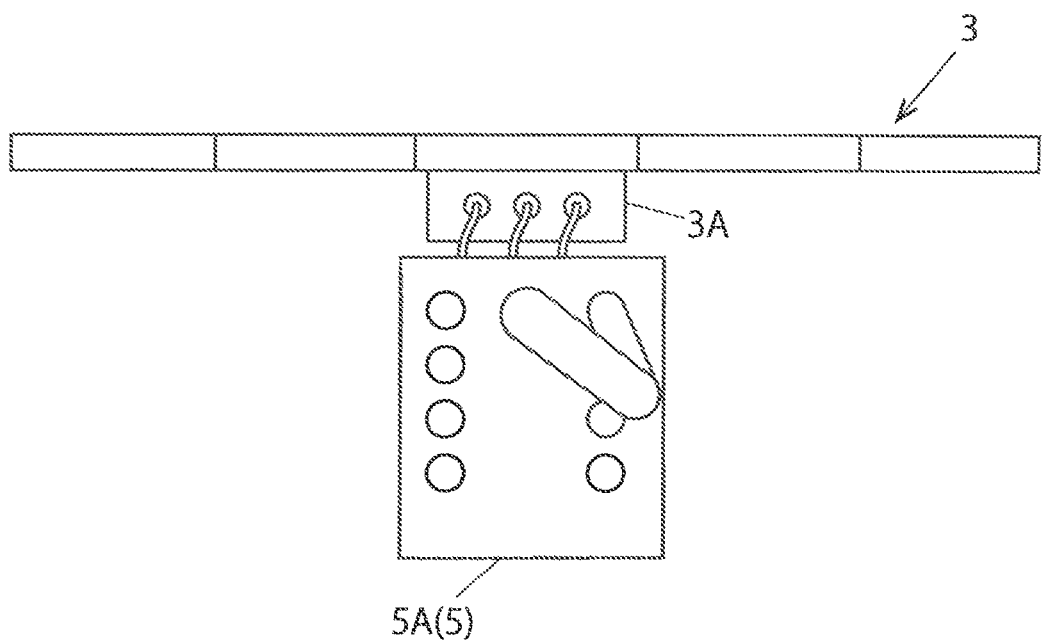
FIG. 39 is a side view schematically illustrating a state that a unit of the nursing bed in FIG. 38 is removed.

Next, a nursing bed according to another embodiment of this invention will be described referring to FIG. 38 and FIG. 39.

The nursing bed according to this embodiment is configured as a module type such that the bed portion unit 3A and the driving mechanism 5 can be detachably mounted to a desired position of the whole bed portion. Specifically, in the above-mentioned embodiment in FIG. 32, the driving mechanism 5 is modularized into separable units 5A, 5B so as to be detachable, as illustrated in FIG. 38. Thereby, the unit 5B as a part of the driving mechanism 5 can be removed as illustrated in FIG. 39.

In this embodiment, a single robot is shared by a plurality of modules 5A, 5B. Thereby, the structure can be simplified and manufacturing cost can be reduced.

Since the nursing bed according to this embodiment is configured as a module type such that the bed portion unit 3A and the driving mechanism 5 can be detachably mounted to a desired position of the whole bed portion, a module can be properly added to a part where especially bedsores need to be prevented according to types of the care receivers P (severely ill in legs, severely ill in the waist, or the like). Thereby, various types of care receivers F can be flexibly cared.

Figure 40:
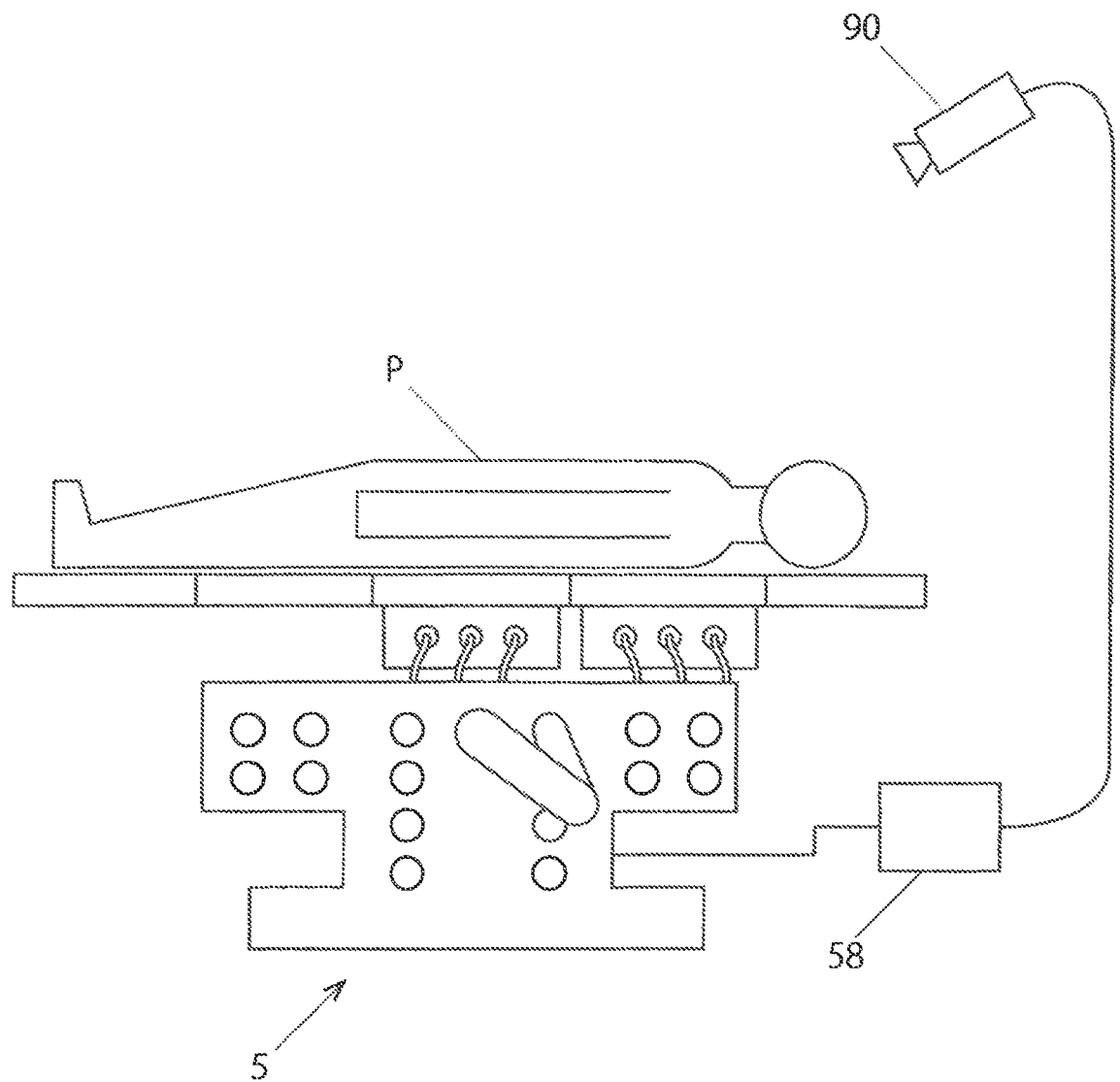
FIG. 40 is a side view schematically illustrating another embodiment of the nursing bed in FIG. 1.

Next, a nursing bed according to another embodiment of this invention will be described referring to FIG. 40 to FIG. 42.

The nursing bed according to this embodiment comprises, in above-mentioned each embodiment and its variation, a posture information acquisition unit 90 to acquire a posture information about a posture of the care receiver P lying on the bed and a control unit 58 to control the driving mechanism (movable member driving unit) 5 based on the posture information acquired by the posture information acquisition unit 30 so as to change the posture of the care receiver P into a predetermined posture by motions of the mobile bodies (movable members) 13B.

The control unit 58 analyzes a current posture information acquired by the posture information acquisition unit 90 and a posture information of a target predetermined posture, and makes the mobile bodies 13B move multiple times so that the difference between the current posture and the predetermined posture of the care receiver P becomes smaller.

The posture information acquisition unit 90 is preferably an infrared camera for acquiring a posture information by imaging the care receiver P. By using the infrared camera, even when the care receiver P is covered with bedclothes, the posture and position of a human body can be specified by an image process for extracting only the limbs of the human body.

In the nursing bed according to this embodiment, a plurality of easy postures for the care receiver P or postures instructed by a physician are previously registered so that the current posture can approach one certain easy posture little by little. Alternatively, one easy posture can be shifted to another easy posture gradually.

In this manner, a plurality of mobile bodies 13B are rotationally moved in order little by little so that the posture of the care receiver P can be a certain (easy) posture, enabling a natural body position movement for the care receiver P.

Figure 41:
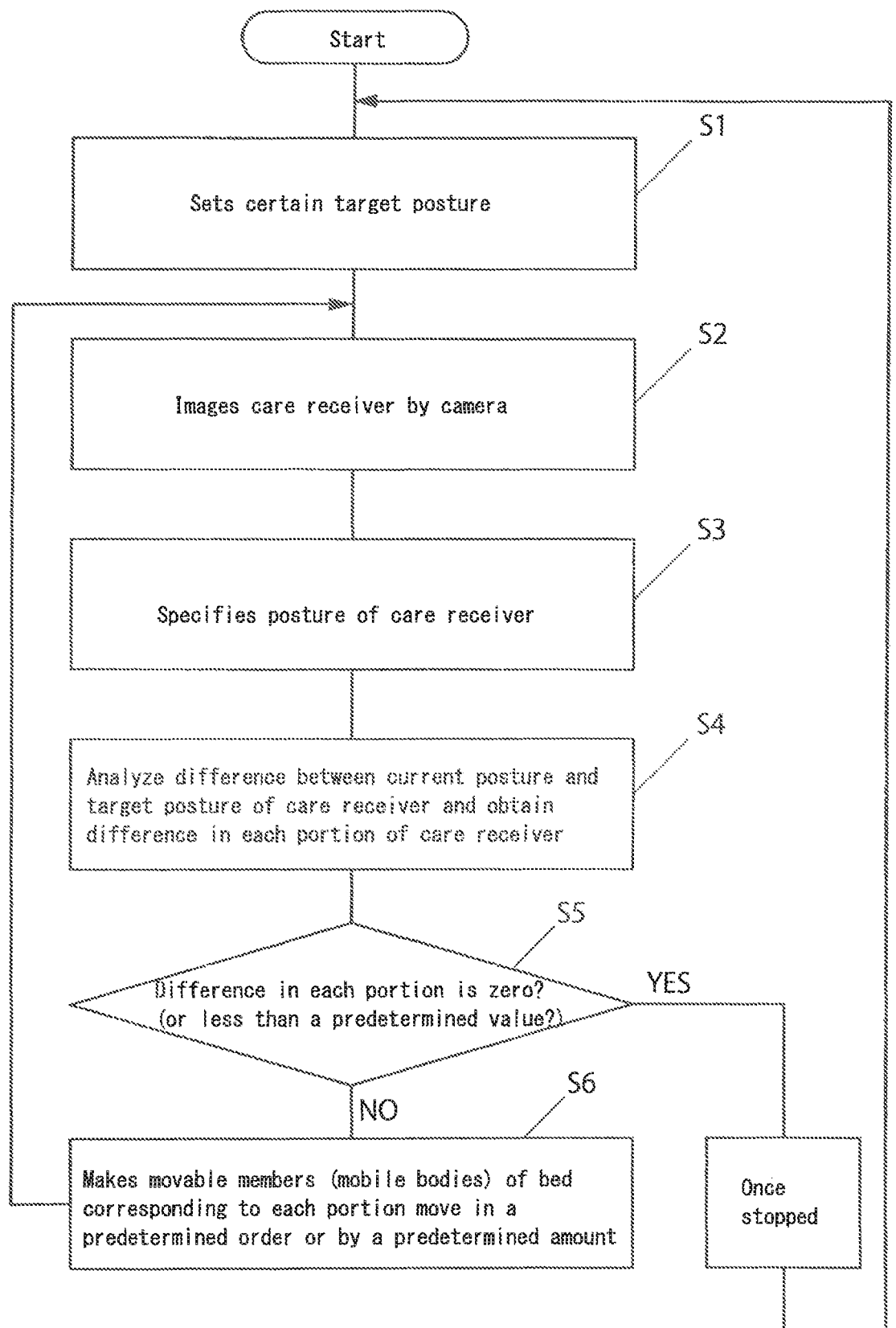
FIG. 41 is a flow chart illustrating the operation of the nursing bed in FIG. 40.

FIG. 41 illustrates an operation procedure of the nursing bed according to this embodiment. First, a certain target posture is set (S1), and the care receiver P is imaged by the camera 90 (S2) so as to specify the posture of the care receiver P (S3). Next, the difference between the current posture and the target posture of the care receiver P is analyzed, and the difference in each portion (shoulder portion, waist portion, or the like) of the care receiver is obtained (S4).

It is determined whether the obtained posture difference in each portion is zero or a predetermined value or less (S5), and if YES, the operation is once ended. In contrast, if the obtained difference is not zero or more than the predetermined value (NO), the mobile bodies (movable members) 13B corresponding to each portion are moved in a predetermined order or by a predetermined amount, and then return to the step S2.

Note that the rotational motions of the mobile bodies 13B above are sequentially performed at a predetermined time interval by sequentially setting new target postures in the step S1. Thereby, bedsores of the care receiver P lying on the bed for a long period of time can be effectively prevented.

FIG. 42 illustrates an example of a pattern of changing from the current angle to the target angle when moving the mobile bodies (movable member) 13B. For convenience, for each portion, a rotational angle about the longitudinal axis direction of the bed is assumed. As a basic motion, respective portions are moved by a predetermined amount one by one. A plurality of portions may be moved simultaneously. Note that, however, a plurality of robot arms 6 are needed in that case. A predetermined amount moved at a time may be different between respective portions.

In a conventional nursing bed, the shape of the bed is formed in a certain posture and a posture of the care receiver P follows and fits to the shape of the bed. However, a gap is often present between the shape of the bed and the posture of the care receiver P, and therefore there are restrictions to bring the care receiver P into a desirable posture.

In contrast, in the nursing bed according to this embodiment, the care receiver P is imaged by the camera 90 so as to specify the posture, and the posture, of the care receiver P is proactively brought into a desired posture based on the specified posture. Thereby, the posture of the care receiver P can be exactly changed into a desired posture.

DESCRIPTION OF REFERENCE NUMERALS

1 . . . nursing bed
2 . . . bed surface
2A . . . fixed bed surface
2B . . . movable bed surface
3 . . . bed portion
3A . . . bed portion unit
4 . . . bed base
5 . . . driving mechanism
6 . . . robot arm
6a . . . proximal end portion of robot arm
6b . . . distal end portion of robot arm
7 . . . driving force input port
8 . . . head region
9 . . . shoulder region
10 . . . waist region
11 . . . leg region
12 . . . rectangular member
13A . . . fixed member
13B . . . movable member (mobile body)
14 . . . movable rectangular piece
15 . . . support base portion
16, 18, 37, 46 . . . linear motion support member (linear guide)
17 . . . movable support plate
19, 24, 24A, 36, 38, 45 . . . rack
20, 25, 35, 39, 44 . . . pinion
21, 26, 32, 34, 43 . . . connection shaft
22, 33, 42 . . . worm gear
23, 40, 41 . . . input shaft
27, 28, 48, 59, 60, 70 . . . bevel gear
29, 31 . . . pulley
30 . . . belt
47 . . . pressing-up member
49 . . . link member
51 . . . robot main shaft
52 . . . rotational driver
53 . . . proximal end side link member
54 . . . distal end side link member
55, 56, 57 . . . driving motor
58 . . . robot control portion
61 . . . through hole
62 . . . rotational driving shaft
63 . . . air cylinder
64 . . . piston
65 . . . bearing
66, 67 . . . hub of oldham coupling
68 . . . slider of oldham coupling
69 . . . spring
71, 75, 80 . . . ball screw
72, 77 . . . toothed belt
73, 79, 83 . . . inner port
74, 76, 81 . . . nut member
82, 85 . . . flexible wire
84 . . . limit switch
86 . . . bed portion unit driving unit
L1 . . . first axis
L2 . . . second axis
L3 . . . third axis
P . . . care receiver P

The invention claimed is:

1. A nursing bed extending in a longitudinal direction and extending in a lateral direction, the nursing bed comprising:
a fixed member forming a fixed bed surface of a bed portion, the fixed member having a plurality of slender parts extending in the lateral direction or in the longitudinal direction;
a plurality of movable members configured to be moved relative to the fixed member and form a movable bed surface of the bed portion, each moveable member of the plurality of movable members having a mobile body configured to protrude in an upward direction relative to the fixed bed surface and to be moved in at least one of the longitudinal direction and the lateral direction within an interval between a pair of slender parts of the plurality of slender parts; and
a movable member driving unit configured to drive the plurality of movable members, the movable member driving unit including:
a plurality of driving force input ports corresponding to the plurality of movable members, each driving force input port of the plurality of driving force input ports being configured to move a corresponding moveable member of the plurality of movable members; and a rotational driver mounted to a distal end of a robot arm, the robot arm being configured to (i) selectively connect the rotational driver to a driving force input port of the plurality of driving force input ports, and (ii) disconnect the rotational driver from the selectively connected driving force input port.

2. The nursing bed according to claim 1, wherein the fixed member includes a plurality of additional slender parts each extending in the longitudinal direction or the lateral direction such that the fixed member is formed as a lattice by the plurality of slender parts and the plurality of additional slender parts.

3. The nursing bed according to claim 1, wherein:
each movable member of the plurality of moveable members has a plurality of mobile bodies, and
the movable member driving unit is configured to move the plurality of mobile bodies simultaneously.

4. The nursing bed according to claim 1, wherein:
each movable member of the plurality of moveable members has a plurality of mobile bodies, and
the movable member driving unit is configured to move the plurality of mobile bodies independently from each other.

5. The nursing bed according to claim 1, wherein the movable member driving unit is configured to transmit a rotational driving force from the rotational driver each movable member of the plurality of movable members.

6. The nursing bed according to claim 1, wherein, in a default position, the plurality of moveable members are positioned such that the movable bed surface is at a same level or at a level lower than the fixed bed surface with respect to the upward direction.

7. A nursing bed extending in a longitudinal direction and extending in a lateral direction, the nursing bed comprising:
a bed portion having a plurality of bed portion units configured to be moved so as to be inclined independently from each other; and
a bed portion unit driving unit configured to drive the plurality of bed portion units such that the plurality of bed portion units are inclined independently from each other,
wherein:
each of the plurality of bed portion units has (i) a fixed member forming a fixed bed surface of the bed portion unit, (ii) a plurality of movable members configured to be moved relative to the fixed member and form a movable bed surface of the bed portion unit, and (iii) a movable member driving unit configured to drive each moveable member of the plurality of movable members,
each movable member of the plurality of movable members has a mobile body configured to be protruded upward relative to the fixed bed surface and moved in at least one of the longitudinal direction and the lateral direction via an opening formed in the fixed member by the movable member driving unit, and
the movable member driving unit includes:
a plurality of driving force input ports corresponding to the plurality of movable members, each driving force input port of the plurality of driving force input ports being configured to move a corresponding moveable member of the plurality of movable members; and a rotational driver mounted to a distal end of a robot arm, the robot arm being configured to (i) selectively connect the rotational driver to a driving force input port of the plurality of driving force input ports, and (ii) disconnect the rotational driver from the selectively connected driving force input port.

8. The nursing bed according to claim 7, wherein, in at least one bed portion unit of the plurality of bed portion units, the movable member driving unit is configured to move the mobile body rotationally about an axis in the longitudinal direction or an axis in the lateral direction.

9. The nursing bed according to claim 7, wherein:
at least one bed portion unit of the plurality of bed portion units includes a plurality of mobile bodies, and
the movable member driving unit is configured to move the plurality of mobile bodies independently from each other.

10. The nursing bed according to claim 7, wherein:
at least one bed portion unit of the plurality of bed portion units includes the plurality of mobile bodies, and
the movable member driving unit is configured to move the plurality of mobile bodies belonging to a common bed portion unit simultaneously.

11. The nursing bed according to claim 7, wherein:
each of at least two bed portion units of the plurality of bed portion units includes a plurality of mobile bodies, and
the movable member driving unit is configured to move the plurality of mobile bodies belonging to one of the at least two bed portion units different from the plurality of mobile bodies belonging to the other one of the at least two bed portion units.

12. The nursing bed according to claim 7, wherein at least one of the bed portion unit driving unit and the movable member driving unit is configured such that a rotational driving force is transmitted from the rotational driver.

13. The nursing bed according to claim 7, wherein, in a default position, the plurality of moveable members are arranged such that the movable bed surface is at a same level or at a level lower than the fixed bed surface with respect to an upwards direction.

14. A nursing bed having a bed portion on which a care receiver lies, comprising:
a plurality of movable members forming at least a part of the bed portion;
a movable member driving unit configured to make the movable member move, the movable member driving unit including:
a plurality of driving force input ports corresponding to the plurality of movable members, each driving force input port of the plurality of driving force input ports being configured to move a corresponding moveable member of the plurality of movable members, and
a rotational driver mounted to a distal end of a robot arm, the robot arm being configured to (i) selectively connect the rotational driver to a driving force input port of the plurality of driving force input ports, and (ii) disconnect the rotational driver from the selectively connected driving force input port;
a posture information acquisition unit configured to acquire a posture information about a posture of the care receiver lying on the bed portion; and
a control unit configured to control the movable member driving unit based on the posture information acquired by the posture information acquisition unit so as to change the posture of the care receiver into a predetermined posture by a motion of a movable member of the plurality of moveable members.

15. The nursing bed according to claim 14, wherein the control unit analyzes a current posture information acquired by the posture information acquisition unit and a posture information of the predetermined posture as a target, and makes each movable member of the plurality of moveable members move multiple times so as to gradually make a difference between the current posture and the predetermined posture of the care receiver smaller.

16. The nursing bed according to claim 14, wherein the posture information acquisition unit acquires the posture information by imaging the care receiver.

17. The nursing bed according to claim 14, wherein the movable member driving unit is configured such that a rotational driving force is transmitted from a rotational driver mounted to a distal end portion of a robot arm.

18. The nursing bed according to claim 17, wherein the movable member driving unit has a plurality of rotated drivers selectively and separably connected to the rotational driver, and the plurality of rotated drivers are installed corresponding to motions of the plurality of movable members different from each other, respectively.

19. The nursing bed according to claim 14, wherein the plurality of moveable members are arranged such that the movable bed surface is normally positioned at a same level as the fixed bed surface or at a level lower than the fixed bed surface.

20. A nursing bed having a bed portion on which a care receiver lies, comprising:
    a plurality of movable members forming at least a part of the bed portion; and
    a movable member driving unit configured to make the movable member move, the movable member driving unit including:
        a plurality of driving force input ports corresponding to the plurality of movable members, each driving force input port of the plurality of driving force input ports being configured to move a corresponding moveable member of the plurality of movable members, and
        a rotational driver mounted to a distal end of a robot arm, the robot arm being configured to (i) selectively connect the rotational driver to a driving force input port of the plurality of driving force input ports, and (ii) disconnect the rotational driver from the selectively connected driving force input port,
    wherein the plurality of moveable members and the movable member driving unit are configured as a module type so as to be capable of being detachably mounted to a desired position of a whole bed portion.

21. The nursing bed according to claim 20, wherein the movable member driving unit is configured such that a rotational driving force is transmitted from the rotational driver mounted to the distal end of the robot arm.

22. The nursing bed according to claim 21, wherein the movable member driving unit has a plurality of rotated drivers selectively and separably connected to the rotational driver, and the plurality of rotated drivers are installed corresponding to motions of the movable members different from each other, respectively.

23. The nursing bed according to claim 20, wherein the plurality of moveable members are arranged such that the movable bed surface is normally positioned at a same level as the fixed bed surface or at a level lower than the fixed bed surface.

24. A nursing bed comprising:
    a bed portion;
    a plurality of movable members forming at least a part of the bed portion; and
    a movable member driving unit configured to move the plurality of movable members, the movable member driving unit including:
        a rotational driver mounted to a distal end portion of a robot arm, the movable member driving unit being configured to transmit a rotational driving force from the rotational driver mounted to the distal end portion of the robot arm to the movable member,
        the movable member driving unit having a plurality of rotated drivers selectively and independently connected to the rotational driver, the plurality of rotated drivers being installed corresponding to respective independent motions of the plurality of movable members, and
        a plurality of driving force input ports corresponding to the plurality of movable members, each driving force input port of the plurality of driving force input ports being configured to move a corresponding moveable member of the plurality of movable members,
    a fixed member including a plurality of additional slender parts each extending in a longitudinal direction or a lateral direction such that the fixed member is formed as a lattice by a plurality of slender parts and the plurality of additional slender parts,
    wherein:
        the robot arm is configured to (i) selectively connect the rotational driver to a driving force input port of the plurality of driving force input ports, and (ii) disconnect the rotational driver from the selectively connected driving force input port, and
        the plurality of movable members and the movable member driving unit are configured as a module type so as to be configured to be detachably mounted to a desired position of a whole bed portion.

* * * * *